US011965050B2

(12) United States Patent
Schellekens et al.

(10) Patent No.: US 11,965,050 B2
(45) Date of Patent: Apr. 23, 2024

(54) WATERBORNE CROSSLINKABLE DISPERSIONS

(71) Applicant: COVESTRO (NETHERLANDS) B.V., Geleen (NL)

(72) Inventors: Michael Arnoldus Jacobus Schellekens, Echt (NL); Johannes Hendrikus De Bont, Echt (NL); John Barbosa, Echt (NL); Jon Andrew Cronin, Echt (NL); Charles Shearer, Echt (NL); Matthew Stewart Gebhard, Echt (NL); Gerardus Cornelis Overbeek, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 555 days.

(21) Appl. No.: 16/771,903

(22) PCT Filed: Dec. 18, 2018

(86) PCT No.: PCT/EP2018/085651
§ 371 (c)(1),
(2) Date: Jun. 11, 2020

(87) PCT Pub. No.: WO2019/121782
PCT Pub. Date: Jun. 27, 2019

(65) Prior Publication Data
US 2021/0070977 A1   Mar. 11, 2021

Related U.S. Application Data

(60) Provisional application No. 62/607,474, filed on Dec. 19, 2017, provisional application No. 62/607,481, filed on Dec. 19, 2017.

(30) Foreign Application Priority Data

Feb. 22, 2018   (EP) .................................... 18158224
Feb. 22, 2018   (EP) .................................... 18158226

(51) Int. Cl.
*C08F 293/00*   (2006.01)
*C08F 2/22*   (2006.01)
(Continued)

(52) U.S. Cl.
CPC ............ *C08F 293/005* (2013.01); *C08F 2/22* (2013.01); *C08F 220/06* (2013.01);
(Continued)

(58) Field of Classification Search
None
See application file for complete search history.

(56) References Cited

U.S. PATENT DOCUMENTS

2011/0021689 A1\*   1/2011   Schellekens ......... C09D 133/08
524/505
2011/0111244 A1\*   5/2011   Schellekens ......... C09D 153/00
524/505

FOREIGN PATENT DOCUMENTS

EP   1 138 730   10/2001
WO   2009/090252   7/2009
WO   2009/121911   10/2009

OTHER PUBLICATIONS

International Search Report for PCT/EP2018/085651, mailed Mar. 18, 2019, 3 pages.
(Continued)

*Primary Examiner* — Randy P Gulakowski
*Assistant Examiner* — Ha S Nguyen
(74) *Attorney, Agent, or Firm* — The Webb Law Firm

(57) ABSTRACT

The present invention further relates to a waterborne dispersion comprising (A) polymer P; (B) amphiphilic block copolymer obtained with a controlled radical polymerization process and comprising at least blocks [A] and [B], whereby block [A] comprises ethylenically unsaturated monomer(s) bearing water-soluble and/or water-dispersible functional
(Continued)

Figure 1:
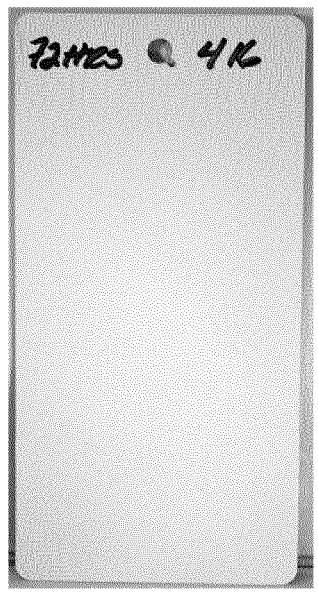

groups (monomer(s) (i)), and block [B] comprises ethylenically unsaturated monomer(s) different from monomer(s) (i) (monomer(s) (ii)); and (C) crosslinker, characterized in that the polymer P is crosslinkable and comprises ethylenically unsaturated monomer(s) bearing crosslinkable functional groups different from monomer(s) (i) and monomer(s) (ii) (monomer(s) (iii)) in an amount of from 1 to 10 wt. %, based on the total weight of monomers used to prepare the polymer P, the amount of lock copolymer is higher than 1 wt. % and lower than 30 wt. %, based on the total weight of monomers used to prepare the block copolymer and polymer P; the acid value of the composition consisting of block copolymer and polymer P is higher than 1 and lower than 17 mg KOH per g of the block copolymer-polymer P composition.

32 Claims, 3 Drawing Sheets

(51) Int. Cl.
| | |
|---|---|
| *C08F 220/06* | (2006.01) |
| *C08F 220/14* | (2006.01) |
| *C08F 220/18* | (2006.01) |
| *C08F 220/56* | (2006.01) |
| *C08F 287/00* | (2006.01) |
| *C08J 7/04* | (2020.01) |
| *C08J 7/043* | (2020.01) |
| *C08J 7/046* | (2020.01) |
| *C08J 7/056* | (2020.01) |
| *C08K 3/22* | (2006.01) |
| *C08K 5/00* | (2006.01) |
| *C08L 33/10* | (2006.01) |
| *C08L 53/00* | (2006.01) |
| *C09D 5/02* | (2006.01) |
| *C09D 151/00* | (2006.01) |
| *C09D 153/00* | (2006.01) |

(52) U.S. Cl.
CPC ...... *C08F 220/14* (2013.01); *C08F 220/1804* (2020.02); *C08F 220/56* (2013.01); *C08F 287/00* (2013.01); *C08J 7/0427* (2020.01); *C08J 7/043* (2020.01); *C08J 7/046* (2020.01); *C08J 7/056* (2020.01); *C08K 3/22* (2013.01); *C08K 5/0025* (2013.01); *C08L 33/10* (2013.01); *C08L 53/00* (2013.01); *C09D 5/022* (2013.01); *C09D 151/003* (2013.01); *C09D 153/00* (2013.01); *C08F 2438/03* (2013.01); *C08J 2327/06* (2013.01); *C08J 2433/10* (2013.01); *C08J 2453/00* (2013.01); *C08K 2003/2241* (2013.01); *C08L 2201/54* (2013.01)

(56) References Cited

OTHER PUBLICATIONS

Written Opinion of the ISA for PCT/EP2018/085651, mailed Mar. 18, 2019, 5 pages.

* cited by examiner

WATERBORNE CROSSLINKABLE DISPERSIONS

This application is the U.S. national phase of International Application No. PCT/EP2018/085651 filed 18 Dec. 2018, which designated the U.S. and claims priority to EP Patent Application No. 18158224.8 filed 22 Feb. 2018, and EP Patent Application No. 18158226.3 filed 22 Feb. 2018, and claims the benefit of U.S. Application No. 62/607,474 filed 19 Dec. 2017, and U.S. Patent Application No. 62/607,481 filed 19 Dec. 2017, the entire contents of each of which are hereby incorporated by reference.

The present invention relates to a waterborne dispersion, a process for preparing the waterborne dispersion, and to a coating composition comprising the waterborne dispersion. The waterborne dispersion comprises a polymer composition comprising an amphiphilic block copolymer and a crosslinkable polymer P, and a crosslinker. The amphiphilic block copolymer acts as stabilizer in the polymerization to prepare polymer P and as stabilizer for the waterborne dispersion. The present invention also relates to the use of such coating composition for coating a substrate comprising in particular aluminum and being for example in the form of a profile for an architectural article, for example a door frame, a window frame or door panel.

Over the last years, there has been an increase in demand for profiles for architectural article, like for example windows and doors, that are constructed of thermoplastic material, in particular polyvinyl chloride (PVC), or aluminum, that are coated in order to protect the profile and/or provide the profile with a customized color. In order to assure the quality for completely fabricated door and window units, the components as well as the way they interact in a total window or door design must be considered. In addition to sealants, hardware and weatherstripping, key among these components for product longevity is the coating that is applied to the basic framing material. Such coatings are often expected to meet stringent performance requirements, such as those set forth in American Architectural Manufacturers Association (AAMA) specifications. The AAMA specifications are one of the strictest standards all over the world. These standards describe laboratory test methods and performance criteria for various parameters shown to be critical for the performance of organic coatings on various profile substrates. They are organized in a sequential basic, high and superior performance of increasingly stringent performance criteria. This hierarchy allows an architect to choose the best and most cost-effective match for the type and location of building and its typical weather exposure. One of the most critical substrates are substrates comprising (pre-treated) aluminum. For coatings on aluminum substrates, the high and superior performance standards are AAMA 2604 and AAMA 2605, both revised in 2017 (referred to herein as "AAMA 2604-17" and "AAMA 2605-17"). The detergent resistance test as described in section 8.7.4 of the AAMA 2604 and 2605 specification, is considered one of the most critical AAMA tests. According to this test, coated panels must be able to withstand 72 hours of immersion in an alkaline detergent solution of 38° C.

EP1219686 (Daikin) describes a powder coating composition comprising a fluorine-containing copolymer that is able to result in a coating satisfying the weather resistance test described in AAMA 2605. Detergent resistance testing according to the AAMA 2604 and AAMA 2605 standard is also done. Powder coating compositions are cured at temperatures above 100° C. There is a market need for coating compositions which are cost-effective, and that can be applied and dried at temperatures below 100° C.

US2006166007 (Solvay) describes the use of vinylidene fluoride aqueous dispersions having particles with a specific average diameter for the preparation of paints for high performance exterior architectural coatings. The paints are prepared from coagulated, washed and dried vinylidene fluoride dispersion, which are subsequently annealed at 249° C. Detergent resistance testing according to the AAMA 2605 standard is also done.

Acrylic polymer coating composition are known to be cost-effective. However acrylic polymer coating composition satisfying at least the detergent resistance as specified in AAMA 2604-17 and AAMA 2605-17 are not known.

The object of the present invention is to provide a waterborne dispersion of acrylic polymer(s) which can be used in coating compositions which are able to provide coatings that meet at least the detergent resistance test described in AAMA 2604-17, section 8.7.4. and the detergent resistance test described in AAMA 2605-17, section 8.7.4.

It has surprisingly been found that this object can be achieved by the use of a coating composition comprising a waterborne dispersion comprising
(A) polymer P;
(B) amphiphilic block copolymer obtained by controlled radical polymerization and comprising at least blocks [A] and [B] whereby block [A] comprises at least ethylenically unsaturated monomer(s) bearing water-soluble and/or water-dispersible functional groups (monomer(s) (i)), and block [B] comprises at least ethylenically unsaturated monomer(s) different from monomer(s) (i) (monomer(s) (ii)); and
(C) crosslinker, characterized in that
the polymer P is crosslinkable and comprises ethylenically unsaturated monomer(s) bearing crosslinkable functional groups different from monomer(s) (i) and monomer(s) (ii) (monomer(s) (iii)) in an amount of from 1 to 10 wt. %, based on the total weight of monomers used to prepare the polymer P,
the amount of block copolymer is higher than 1 and lower than 30 wt. %, based on the total weight of monomers used to prepare the block copolymer and polymer P;
the acid value of the composition consisting of the block copolymer and polymer P (further referred to as the block copolymer-polymer composition) is higher than 1 and lower than 17 mg KOH per g of block copolymer-polymer composition.

It has surprisingly been found that the block copolymer-crosslinkable polymer compositions allow to prepare stable aqueous dispersions which can be used in one-pack coating compositions and which are found to be beneficial for balancing good detergent resistance according to section 8.7.4 of the AAMA 2604-17 and 2605-17 specification with good coating adhesion properties.

One-pack systems are systems comprising reactive materials, such as for example a composition comprising crosslinker and compound(s) with crosslinkable groups, stored together in for example a container. The dispersion and the coating composition according to the invention can be applied as a one-pack system without the necessity of mixing reactive materials just prior to application as in a two-pack system. A two-pack system refers to a system comprising at least two reactive components that are stored separately, for example in two separate containers. While two-pack systems may result in a coating with good performance, the reactive materials have to be stored in separate containers and can only be mixed just prior to application which is cumbersome.

As used herein, a one-pack waterborne dispersion respectively a one-pack waterborne coating composition is a waterborne dispersion respectively a one-pack waterborne coating composition having a shelf life of at least 6 months, preferably of at least one year, at 25° C. Shelf-life is defined herein as the length of time that the waterborne dispersion or the waterborne coating composition can be stored in a closed vessel at ambient temperature without clear signs of colloidal instability such as phase separation or gelation, and without significant viscosity changes such as an increase in Brookfield viscosity by a factor of two or more. Timing starts from the moment the one-pack product comprises the reactive materials, and is measured at 25° C. The viscosity (in mPa·s) is measured on a Brookfield viscometer (DV-I™ Viscometer from Brookfield Engineering) using an appropriate spindle at 60 rpm.

WO09090252 describes a process for preparing a waterborne crosslinkable composition comprising a crosslinkable block copolymer comprising at least blocks $[A]_x[B]_y$ and a polymer P, the block copolymer-polymer composition having an acid value ≤150 mg KOH per g of block copolymer-polymer, where at least block [A] and [B] is obtained by a controlled radical polymerization of at least one ethylenically unsaturated monomer via a reversible addition-fragmentation chain transfer (RAFT) mechanism in solution in the presence of a control agent and a source of free radicals; where block [A] at least comprises ethylenically unsaturated monomer units bearing water-dispersing functional groups; block [B] comprises ethylenically unsaturated monomer units bearing crosslinking functional groups and ethylenically unsaturated monomers units selected from $C_{1-18}$ alkyl (meth)acrylate monomers and styrenic monomers; where the polymer P is obtained in the presence of the block copolymer by an emulsion polymerization process and comprises ethylenically unsaturated monomers units selected from $C_{1-18}$ alkyl(meth)acrylate monomers and styrenic monomers. WO-A-09121911 describes a process for preparing an aqueous coating composition comprising a block copolymer comprising at least blocks $[A]_x[B]_y$ and a polymer P, where at least block [A] is obtained by a controlled radical polymerization of at least ethylenically unsaturated monomer units bearing water-dispersing functional groups via a reversible addition-fragmentation chain transfer (RAFT) mechanism; block [B] comprises ethylenically unsaturated monomer units bearing plastic adhesion promoting functional groups; where the polymer P is obtained in the presence of the block copolymer by an emulsion polymerization process and comprises $C_{1-8}$ alkyl(meth)acrylate monomers. These publications are silent on the specifications AAMA 2604 and AAMA 2605, and do not teach that waterborne dispersions according to the present invention can be used in coating compositions which are able to provide coatings that meet at least the detergent resistance test described in AAMA 2604-17, section 8.7.4 and the detergent resistance test described in AAMA 2605-17, section 8.7.4.

The dispersions and coating compositions according to the invention are waterborne. As used herein, "waterborne" means that the principal solvent or carrier fluid, i.e. the continuous phase, in the coating composition is water. The continuous phase is preferably at least 70 wt. % water, more preferably at least 80 wt. % and even more preferably at least 85 wt. % water, based on the total weight of the continuous phase.

For all upper and/or lower boundaries of any range given herein, the boundary value is included in the range given. Thus, when saying from x to y, means including x and y.

The acid value of the block copolymer-polymer composition is preferably higher than 1.5 and lower than 17 mg KOH per g of the block copolymer-polymer P composition. The acid value of the block copolymer-polymer composition is preferably higher than 1.5 and less than or equal to 16 mg KOH per g of the block copolymer-polymer P composition. More preferably, the acid value of the block copolymer-polymer composition is from 3 to 16 mg KOH per g of the block copolymer-polymer P composition. Even more preferably, the acid value of the block copolymer-polymer composition is from 3 to 15, even more preferably from 5 to 15 and most preferably from 9 to 15 mg KOH per g of the block copolymer-polymer P composition. The acid value of the composition consisting of the block copolymer and the polymer P is calculated based on the monomers charged in the polymerization processes to prepare the block copolymer and the polymer P, i.e. the acid value of the composition consisting of the block copolymer and the polymer P is calculated according to the formula AV=((total molar amount of acid functional monomers charged in the polymerization processes to prepare the block copolymer and the polymer P per gram of total amount of monomers charged in the polymerization processes to prepare the block copolymer and the polymer P)*56.1*1000) and is denoted as mg KOH per gram of the block copolymer-polymer P composition. In case acid functional monomer(s) are used which contains at least two acid functional groups, the molar amount of such acid functional monomer must be multiplied with the number of acid functional groups present in the acid functional monomer. For example, in case the applied acid functional monomer is two functional, the acid value is calculated as follows: AV=(((total molar amount of acid functional monomers charged in the polymerization processes to prepare the block copolymer and the polymer P)×2) per gram of total amount of monomers charged in the polymerization processes to prepare the block copolymer and the polymer P)*56.1*1000).

The waterborne dispersion of the invention comprises a block copolymer and a polymer P which is different from the block copolymer. The polymerization to prepare polymer P is preferably emulsion polymerization. A conventional emulsion polymerization process is carried out in water using monomer(s), surfactant(s) and a water-soluble initiator. It is known that surfactants play a critical role in stabilizing the dispersion of polymer particles during formation and in preventing coagulation of the final latex on standing. In the present invention, the block copolymer is amphiphilic and most preferably has sufficient amount of ionic-functional groups that allow the block copolymer to act as polymeric surfactant or block copolymer micelle or block copolymer "seed" in the polymerization to prepare polymer P, and to act as stabilizer for the waterborne dispersion. Hence, the preparation of polymer P is effected in the presence of the block copolymer. As used herein, unless otherwise stated, the term "amphiphilic block copolymer" refers to a block copolymer that has at least one block hydrophilic of nature (block [A]) and at least one further block being hydrophobic of nature (block [B]). Hydrophobicity may be determined by the Hansch parameter. The Hansch parameter for block [A] is lower than that for block [B]. As used herein, unless otherwise stated, the term "stabilizer" denotes an amphiphilic compound capable of stabilizing a dispersion from coalescing. Where the stabilizer is acting to stabilize a dispersed liquid organic phase in a continuous waterborne phase the stabilizer may also be referred to as a surfactant.

The block copolymer comprises at least blocks [A] and [B] and is obtained by a controlled radical polymerization, whereby block [A] comprises at least ethylenically unsaturated monomer(s) bearing water-soluble and/or water-dispersible functional groups (monomer(s) (i)), and block [B] comprises at least ethylenically unsaturated monomer(s) different from monomer(s) (i) (monomer(s) (ii)). As used herein, water-soluble and/or water-dispersible functional groups in this case refers to the groups that provide block [A] or the block copolymer with a certain degree of water-soluble or water-dispersible character. For example, water soluble means that block [A] and or the block copolymer is fully soluble in water at a concentration of at least 1 wt. % at 25° C.; for example, water dispersible means that block [A] and or the block copolymer does not fully dissolve in water at a concentration of at least 1 wt. % at 25° C. but can be dispersed in water at a concentration of at least 1 wt. % at 25° C. The monomer (i) has at least one non-ionic, ionic or potentially ionic functional group whose presence assists the dispersion or solubility of at least block [A] in water and enhances the stability of the dispersion.

Monomer(s) (i): Ethylenically Unsaturated Monomer(s) Bearing Water-Soluble and/or Water-Dispersible Functional Groups The water-soluble and/or water-dispersible functional groups may be non-ionic or ionic or potentially ionic. Preferably, the water-soluble and/or water-dispersible functional groups are anionic or potentially anionic.

Non-Ionic

Ethylenically unsaturated monomer units bearing non-ionic water-dispersing and/or water-soluble functional groups are for example ethylenically unsaturated monomer units bearing pendant polyoxyalkylene groups, more preferably polyoxyethylene groups, such as ethyldiglycol (meth)acrylate, methoxy(polyethyleneoxide (meth)acrylate) and hydroxy polyethylene glycol (meth)acrylates, preferably having a number average molecular weight of from 350 to 3,000 g/mol. Examples of such ethylenically unsaturated monomers which are commercially available include w-methoxypolyethylene glycol (meth)acrylate. Other vinyl monomers providing non-ionic water dispersible groups include N-vinyl-2-pyrrolidone, acrylamide, methacrylamide, N,N-diethylacrylamide, N,N-diethylmethacrylamide, N-isopropylacrylamide and N-isopropylmethacrylamide.

Ionic or Potentially Ionic

Preferably, ethylenically unsaturated monomer units (i) bearing ionic or potentially ionic water-dispersing and/or water-soluble functional groups are used. The ionic or potentially ionic water-soluble and/or water-dispersible functional groups are preferably in their dissociated (i.e. salt) form to effect their water-soluble and/or water-dispersible action. If they are not dissociated they are considered as potential ionic groups which become ionic upon dissociation. The water-soluble and/or water-dispersible functional groups are preferably fully or partially in the form of a salt in the final composition of the invention. The (potentially) ionic water dispersing and/or water-soluble functional groups can be (potentially) cationic or (potentially) anionic.

Dissociation of potentially anionic water-soluble or water-dispersible functional groups can be effected by deprotonating at least part of the water-soluble and/or water-dispersible functional groups. The deprotonation of at least part of the water-soluble and/or water-dispersible functional groups is preferably effected by neutralizing at least part of the potential water-dispersible and/or the potential water-soluble functional groups. Such neutralizing is preferably effected by addition of a suitable organic or inorganic base such as for example ammonia, triethylamine or sodium hydroxide. Preferred bases are volatile amines, such as ammonia. Dissociation of potentially cationic water-soluble or water-dispersible functional groups can be effected by protonating at least part of the water-soluble and/or water-dispersible functional groups.

The (potentially) ionic water-dispersing and/or water-soluble functional groups can be (potentially) cationic or (potentially) anionic. Preferably, the water-soluble or water-dispersible functional groups are selected from the group consisting of phosphate groups, phosphonate groups, sulfate groups, sulfonate groups, carboxylate groups and any combination thereof. Preferred ethylenically unsaturated monomer(s) (i) bearing water-soluble and/or water-dispersible functional groups are selected from the group consisting of acrylic acid, methacrylic acid, β-carboxyethyl acrylate, itaconic acid, maleic anhydride, itaconic anhydride, styrene sulfonic acid, styrene sulfonate, sodium styrene sulfonate, vinylbenzylsulfonic acid, vinylsulfonic acid, sodium vinylsulfonate, acryloyloxyalkyl sulfonic acids (for example acryloyloxymethyl sulfonic acid), 2-acrylamido-2-alkylalkane sulfonic acids (for example 2-acrylamido-2-methylpropanesulphonic acid), 2-methacrylamido-2-alkylalkane sulfonic acids (for example 2-methacrylamido-2-methylethanesulfonic acid), phosphoric acid 2-hydroxyethyl methacrylate ester, mono(acryloyloxyalkyl)phosphates (for example, mono(acryloyloxyethyl)phosphate and mono(3-acryloyloxypropyl)phosphates) and mono(methacryloyloxyalkyl)phosphates, and/or mixtures thereof. More preferably, the water-soluble and/or water-dispersible functional groups are carboxylate groups. Ethylenically unsaturated monomer(s) (i) bearing water-soluble and/or water-dispersible carboxylate functional groups is preferably selected from the group consisting of acrylic acid, methacrylic acid, β-carboxyethyl acrylate, itaconic acid, maleic anhydride, and any mixture thereof. More preferably, the ethylenically unsaturated monomer(s) (i) bearing water-soluble and/or water-dispersible carboxylate functional groups is selected from the group consisting of acrylic acid, methacrylic acid, and any mixture thereof. Most preferably, the ethylenically unsaturated monomer(s) (i) bearing water-soluble and/or water-dispersible carboxylate functional groups is methacrylic acid.

Examples of (potentially) cationic water-soluble or water-dispersible functional groups are basic amine groups and/or quaternary ammonium groups. Amine functional groups can be converted into cationic functional groups (i.e. quaternized) by protonating the amine functional groups with alkyl halides such as for example methyl chloride, methyl bromide, methyl iodide, dodecyl bromide, hexadecyl bromide, or with suitable acids such as for example hydrochloric acid or formic acid. Examples of unsaturated monomer(s) (i) bearing (potentially) cationic water-soluble and/or water-dispersible functional groups are 2-dimethylaminoethyl acrylate, 2-dimethylaminoethyl methacrylate, 2-acryloyloxy ethyl trimethylammonium chloride, 2-methacryloyloxy ethyl trimethylammonium chloride, 3-acrylamidopropyl trimethylammonium chloride and 3-methacrylamidopropyl trimethylammonium chloride. Preferably, the ethylenically unsaturated monomer(s) (i) bearing (potentially) cationic water-soluble and/or water-dispersible functional groups is 2-dimethylaminoethyl methacrylate.

Examples of (potentially) anionic water-soluble or water-dispersible functional groups are dissociated acid groups, for example phosphate groups, phosphonate groups, sulfate groups, sulfonate groups and carboxylate groups. The deprotonating of at least part of the potentially anionic water-soluble and/or water-dispersible functional groups is preferably effected by neutralizing at least part of the potential water-dispersible and/or the potential water-soluble functional groups. Such neutralizing is preferably effected by addition of a suitable organic or inorganic base as neutralizing agent. Preferred organic bases are volatile amines, such as ammonia. Suitable organic bases also include tertiary amines such as triethylamine or N,N-dimethylethanolamine. Suitable inorganic bases include alkali hydroxides and carbonates, for example lithium hydroxide, sodium hydroxide, and potassium hydroxide. Generally, a base is used which gives counter ions that may be desired for the composition. For example, preferred counter ions include $Li^+$, $Na^+$, $K^+$, $NH_4^+$ and substituted ammonium salts. The neutralizing agent is preferably used in such an amount that the molar ratio of the neutralizing agent to the potentially anionic water dispersing groups is in the range of from 0.3 to 3.0, more preferably from 0.5 to 2.0 and even more preferably from 0.7 to 1.3. Preferred ethylenically unsaturated monomer(s) (i) bearing (potentially) anionic water-soluble and/or water-dispersible functional groups are selected from the group consisting of acrylic acid, methacrylic acid, β-carboxyethyl acrylate, itaconic acid, maleic anhydride, itaconic anhydride, styrene sulfonic acid, styrene sulfonate, sodium styrene sulfonate, vinylbenzylsulfonic acid, vinylsulfonic acid, sodium vinylsulfonate, acryloyloxyalkyl sulfonic acids (for example acryloyloxymethyl sulfonic acid), 2-acrylamido-2-alkylalkane sulfonic acids (for example 2-acrylamido-2-methylpropanesulphonic acid), 2-methacrylamido-2-alkylalkane sulfonic acids (for example 2-methacrylamido-2-methylethanesulfonic acid), phosphoric acid 2-hydroxyethyl methacrylate ester, mono (acryloyloxyalkyl)phosphates (for example, mono(acryloyloxyethyl)phosphate and mono(3-acryloyloxypropyl)phosphates) and mono(methacryloyloxyalkyl)phosphates, and/or mixtures thereof.

Preferably, the water-soluble or water-dispersible functional groups are selected from the group consisting of phosphate groups, phosphonate groups, sulfate groups, sulfonate groups, carboxylate groups and any combination thereof. More preferably, the water-soluble and/or water-dispersible functional groups are carboxylate groups. Ethylenically unsaturated monomer(s) (i) bearing water-soluble and/or water-dispersible carboxylate functional groups is preferably selected from the group consisting of acrylic acid, methacrylic acid, β-carboxyethyl acrylate, itaconic acid, maleic anhydride, and any mixture thereof. More preferably, the ethylenically unsaturated monomer(s) (i) bearing water-soluble and/or water-dispersible carboxylate functional groups is selected from the group consisting of acrylic acid, methacrylic acid, itaconic acid, and any mixture thereof. Even more preferably, the ethylenically unsaturated monomer(s) (i) bearing water-soluble and/or water-dispersible carboxylate functional groups is selected from the group consisting of acrylic acid, methacrylic acid, and any mixture thereof. Most preferably, the ethylenically unsaturated monomer(s) (i) bearing water-soluble and/or water-dispersible carboxylate functional groups is methacrylic acid.

Monomers which may also provide some crosslinking properties such as (meth)acrylic acid are considered herein as monomers providing water-dispersing and/or water-soluble functional groups.

Preferably at least 90 wt. %, more preferably at least 95 wt. % of the total amount of monomer (i) present in the block copolymer-polymer composition is present in block [A].

Preferably, block [A] further comprises, next to the ethylenically unsaturated monomer(s) (i) bearing water-soluble and/or water-dispersible groups, ethylenically unsaturated monomer(s) (ii) different from (i) and (iii).

Monomer(s) (ii): Ethylenically Unsaturated Monomer(s) Different from Monomer(s) (i)

Examples of ethylenically unsaturated monomer(s) (ii) are aryl (meth)acrylates, cycloalkyl (meth)acrylates, and alkyl (meth)acrylates (such as $C_{1-30}$alkyl (meth)acrylates) and/or styrenic monomers (such as $C_{7-18}$styrenic monomers). Suitable monomers include: styrene, α-methyl styrene, t-butyl styrene, chloromethyl styrene, vinyl toluene; and esters of acrylic acid and methacrylic acid of formula $CH_2=CR^5-COOR^4$ wherein $R^5$ is H or methyl and $R^4$ is optionally substituted alkyl, cycloalkyl, aryl or (alkyl)aryl (such as optionally substituted $C_{1-18}$alkyl, $C_{3-18}$cycloalkyl, $C_{6-18}$aryl or $C_{7-18}$(alkyl)aryl) which are also known as acrylic monomers. Examples of suitable (meth)acrylates are methyl (meth)acrylate, ethyl (meth)acrylate, propyl (meth) acrylate (all isomers), butyl (meth)acrylate (all isomers, including for example tert-butyl methacrylate), 2-ethylhexyl (meth)acrylate, isodecyl (meth)acrylate, lauryl (meth)acrylate, tridecyl (meth)acrylate, tetradecyl (meth)acrylate, hexadecyl (meth)acrylate, octadecyl (meth)acrylate (=stearyl (meth)acrylate), cyclohexyl (meth)acrylate, dicyclopentenyloxymethyl (meth)acrylate, benzyl (meth)acrylate, 2-phenoxyethyl (meth)acrylate, 3,3,5-trimethyl-cyclohexyl (meth)acrylate, p-methylphenyl (meth)acrylate, 1-naphtyl (meth)acrylate, 3-phenyl-n-propyl (meth)acrylate, isobornyl (meth)acrylate, and mixtures thereof.

The ethylenically unsaturated monomer(s) (ii) are preferably selected from the group consisting of $C_{1-12}$alkyl(meth) acrylate monomers including methyl (meth)acrylate, ethyl (meth)acrylate, propyl (meth)acrylate (all isomers), butyl (meth)acrylate (all isomers), and 2-ethylhexyl (meth)acrylate; cyclohexyl (meth)acrylate; styrenic monomers and any mixture thereof, preferably the ethylenically unsaturated monomer(s) (ii) are selected from the group consisting of $C_{1-12}$ alkyl(meth)acrylate monomers and any mixture thereof.

Block [B] comprises at least ethylenically unsaturated monomer(s) different from monomer(s) (i) (i.e. monomer(s) (ii)). Preferably the amount of ethylenically unsaturated monomer(s) (ii) in block [B] is at least 75 wt. %, more preferably at least 90 wt. %, most preferably at least 95 wt % relative to the total weight amount of monomers used to prepare block [B]. In the preferred embodiment where block [B] is prepared in the presence of block [A], block [B] usually also contains small amounts of monomer (i) due to incomplete conversion of monomer (i) when preparing block [A]. The amount of ethylenically unsaturated monomer(s) bearing water-soluble and/or water-dispersible functional groups (monomer(s) (i)) in block [B] is however preferably less than 10 wt. %, more preferably less than 5 wt. %, even more preferably less than 1 wt. %, relative to total amount of monomers used to prepare block [B].

Block [B] may further comprise ethylenically unsaturated monomer(s) bearing crosslinkable functional groups different from monomer(s) (i) and different from monomer(s) (ii) (monomer(s) (iii)), preferably in an amount of less than 20 wt. %, more preferably less than 10 wt. % relative to the total weight amount of monomers used to prepare block [B]. Preferably, block [B] does not contain monomer(s) (iii).

A block copolymer is understood to be a copolymer comprising at least two successive sections of blocks of monomer units of different chemical constitutions. The block copolymers of the invention can therefore be diblock, triblock or multiblock copolymers. Block copolymers may be linear, branched, star or comb like, and have structures such as [A][B], [A][B][A], [A][B][C], [A][B][A][B], [A][B][C][B] etc. Preferably the block copolymer is a linear diblock copolymer of structure [A][B], or a linear triblock copolymer of structure [A][B][A]. Block copolymers may have multiple blocks [A], [B] and optionally [C] in which case the block copolymer is represented as for example $[A]_x[B]_y$ or $[A]_x[B]_y[C]_z$, where x, y and z are the degrees of polymerization (DP) of the corresponding blocks [A], [B] or [C].

Furthermore, any of the blocks in the block copolymer could be either a homopolymer, meaning only one type of monomer, or a copolymer, meaning more than one type of monomer. In case of a copolymer type of block the composition could be either random or gradient like, depending on the copolymerization kinetics and or the processing conditions used. A block with a gradient composition is understood to be a block having a continuously changing monomer composition along the block.

The block copolymer is preferably a diblock copolymer $[A]_x[B]_y$ consisting of blocks [A] and [B], whereby block [A] has an average degree of polymerization x where x is preferably an integer from 3 to 200 and block [B] has an average degree of polymerization y where y is preferably an integer >10 and where preferably y>x. More preferably x is lower than 150, more preferably lower than 100 and most preferably lower than 50. More preferably y>50, more preferably >100, and most preferably >150. The term "average degree of polymerization" of a block is defined herein as a theoretical value calculated by dividing the total molar amount of monomers used for preparing the block by the total molar amount of control agent, assuming full conversion of all monomers and control agent.

The amount of the block copolymer is higher than 1 wt. % and lower than 30 wt. %, based on the total weight of monomers used to prepare the block copolymer and polymer P. The amount of the block copolymer is preferably from 2 to 20 wt. %, based on the total weight of monomers used to prepare the block copolymer and polymer P, more preferably from 3 to 15 wt. %, even more preferably from 4 to 12 wt. %.

The weight average molecular weight of the block copolymer is preferably in the range of from 2,000 to 100,000 g/mol, more preferably from 5,000 to 50,000 g/mol and even more preferably from 7,000 to 35,000 g/mol. The weight average molecular weight of the block copolymer-polymer composition is preferably higher than 100,000 g/mol, more preferably in the range of from 100,000 to 500,000 g/mol and even more preferably from 125,000 to 350,000 g/mol. As used herein, the weight average molecular weights (Mw) and number average molecular weights (Mn) of the block copolymer is determined by using size exclusion chromatography (SEC) relative to polystyrene standards, using N-methylpyrrolidone with 0.01 M LiBr and 8 volume-% hexafluoroisopropanol as eluent.

The Tg of a polymer herein stands for the glass transition temperature and is well known to be the temperature at which a polymer changes from a glassy, brittle state to a rubbery state. Tg values of polymers may be determined experimentally using techniques such as Differential Scanning calorimetry (DSC) or calculated theoretically using the well-known Fox equation where the Tg (in Kelvin) of a copolymer having "n" copolymerised comonomers is given by the weight fractions "w" and the Tg values of the respective homopolymers (in Kelvin) of each comonomer type according to the equation "$1/T_g = w_1/T_{g1} + w_2/T_{g2} + \ldots w_n/T_{gn}$".

For purposes of the present invention, the glass transition temperatures of such a homopolymer of a monomer are values shown in Polymer Handbook, $4^{th}$ ed., edited by J. Brandrup, E. H. Immergut and E. A. Grulke, John Wiley and Sons, Inc., 1999 at VI/198 to VI/219.

The glass transition temperature of the block copolymer is preferably from 10 to 250° C., more preferably from 30 to 200° C., even more preferably from 50 to 150° C. and especially preferably from 60 to 120° C., whereby the glass transition temperature is calculated according to the Fox equation and is based on the total monomer composition of the block copolymer, i.e. in case the block copolymer is a diblock copolymer $[A]_x[B]_y$, the calculation is based on the total of monomers in block A and B together.

Polymer P comprises ethylenically unsaturated monomer(s) bearing crosslinkable functional groups different from monomer(s) (i) and monomer(s) (ii) (monomer(s) (iii)) in an amount of from 1 to 10 wt. %, preferably in an amount from 2 to 7.5 wt. % and most preferably from 2 to 5 wt. %, based on the total weight of monomers used to prepare the polymer P. It has been found that in order to meet the detergent resistance requirements of the AAMA standards 2604-17 and 2605-17, one of the key features of the present invention is the presence of crosslinkable functional groups in polymer P in an amount as claimed.

Monomer(s) (iii): Ethylenically Unsaturated Monomer(s) Bearing Crosslinkable Functional Groups Different from Monomer(s) (i) and Different from Monomer(s) (ii)

The ethylenically unsaturated monomer(s) (iii) bearing crosslinkable functional groups are preferably carbonyl functional ethylenically unsaturated monomer(s), more preferably ketone functional ethylenically unsaturated monomer(s). The ketone functional ethylenically unsaturated monomers are preferably selected from the group consisting of (meth)acrolein, diacetone acrylamide, vinyl methyl ketone, and any mixture thereof. Most preferably, the ketone functional ethylenically unsaturated monomer is diacetone acrylamide.

Polymer P preferably further comprises ethylenically unsaturated monomer(s) (ii) as described above.

Optionally block [A], block [B] and/or polymer P further comprises ethylenically unsaturated monomer(s) (iv) different from monomers (i), (ii) and (iii). Examples of monomers (iv) comprise diene monomers preferably $C_{2-18}$ diene monomers such as 1,3-butadiene and isoprene; divinyl benzene; vinyl monomers preferably $C_{2-18}$ vinyl monomers such as acrylonitrile, methacrylonitrile; vinyl halides preferably $C_{2-18}$ vinyl halides such as vinyl chloride; vinylidene halides preferably $C_{2-18}$ vinylidene halides such as vinylidene chloride; vinyl esters preferably $C_{2-18}$ vinyl esters such as vinyl acetate, vinyl propionate, vinyl laurate; vinyl esters of versatic acid such as VEOVA™ 9 and VEOVA™ 10 (VEOVA™ is a trademark of Resolution); heterocyclic vinyl compounds preferably $C_{3-18}$ vinyl heterocycles; alkyl esters of mono-olefinically unsaturated dicarboxylic acids, preferably $C_{1-18}$ alkyl esters such as di-n-butyl maleate and di-n-butyl fumarate; amides of unsaturated carboxylic acids preferably $C_{1-18}$ amides such as N-alkyl(meth)acrylamides that are different from those of monomers i) to iii). Monomer (iv) also includes multi-ethylenically unsaturated monomers such as allyl (meth)acrylate, divinyl benzene, ethylene glycol di(meth)acrylate; alkoxysilane monomers such as gamma-methacryloxypropyl trimethoxysilane; glycidyl (meth)acrylate; hydroxyalkyl (meth)acrylates such as 2-hydroxyethyl (meth)acrylate, 2-hydroxypropyl (meth)acrylate, 4-hydroxybutyl (meth)acrylate and their modified analogues; and ethylenically unsaturated monomer units bearing (wet) adhesion promoting functional groups such as (optionally substituted) amine or urea groups, for example cyclic ureido groups, imidazole groups, pyridine groups, hydrazide or semicarbazide groups, or phosphate groups (others than those mentioned under monomer (i)). Preferred examples of adhesion promoting monomers include phosphate functional monomers (others than those mentioned under monomer (i)) like phosphate esters of polypropylene glycol monomethacrylate and bis(2-methacryloxyethyl) phosphate; and ureido functional monomers like N-(2-methacryloyloxyethyl) ethylene urea or N-(2-methacrylamidoethyl) ethylene urea.

Preferably, block [A], block [B] respectively polymer P contains less than 10 wt. %, more preferably less than 5 wt. %, even more preferably 0 wt. % of ethylenically unsaturated monomer (iv) (relative to total amount of monomer used to prepare block [A], block [B] respectively polymer P). In case monomer (iv) is present in the block copolymer-polymer composition, it is preferably present in polymer P preferably in an amount of at least 0.5 wt. % (relative to total amount of monomer used to prepare polymer P).

Polymer P may contain small amounts of monomer (i) due to incomplete conversion of monomer (i) when preparing the block copolymer. The amount of ethylenically unsaturated monomer(s) bearing water-soluble and/or water-dispersible functional groups (monomer(s) (i)) in polymer P is however preferably less than 10 wt. %, more preferably less than 5 wt. %, even more preferably less than 1 wt. %, relative to total amount of monomers used to prepare polymer P.

Polymer P is preferably more hydrophobic than the block copolymer.

Preferably block [B] and polymer P are more hydrophobic than block [A]. The hydrophobicity of a polymer may be determined by the Hansch parameter. The Hansch parameter for a polymer is calculated using a group contribution method. The monomer units forming a polymer are assigned a hydrophobicity contribution and the hydrophobicity of the polymer, the Hansch parameter, is calculated based on the weight average of the monomers in the polymer as disclosed in for example C. Hansch, P. Maloney, T. Fujita, and R. Muir, Nature, 194. 178-180 (1962). Values of the hydrophobicity contributions for several monomers are for example: styrene 4.29, α-methylstyrene 4.7, methyl methacrylate 1.89, butyl acrylate 3.19, and acrylic acid −2.52. Therefore a polymer made up of STY (20) αMS (20) MMA (20) BA (10) AA (30) has a Hansch value of 1.74.

Preferably the Hansch parameter for block [A] is lower than that for block [B] and lower than that for polymer P.

Preferably block [A] has a Hansch parameter <1.5, more preferably ≤1.2, more preferably ≤1.0, more preferably ≤0.8, more preferably ≤0.6 and even more preferably ≤−1.0.

Preferably block [B] has a Hansch parameter ≥1.5, more preferably ≥1.7, more preferably ≥2.0 and especially ≥2.2.

Preferably polymer P has a Hansch parameter >1.5, more preferably ≥2.2 and especially ≥2.5.

The polymer P may comprise more than one polymer phase, for example when the polymer P is prepared with a sequential polymerization process. Preferably at least 20 wt. %, more preferably at least 30 wt. %, even more preferably at least 50 wt. %, of the polymer composition of the polymer P has a polymer fraction with a calculated glass transition temperature >5° C., more preferably >10° C., even more preferably >15° C. and preferably <90° C., more preferably <70° C., even more preferably <50° C., whereby the calculated glass transition temperature is determined according to the method as described in this specification (using Fox equation).

The waterborne dispersion of the invention comprises a continuous waterborne phase and polymer particles comprising polymer P and block copolymer. The waterborne dispersion of the invention may also comprise polymer particles comprising polymer P, but not block copolymer and may also comprise polymer particles comprising block copolymer, but not polymer P.

The amount of polymer with a weight average molecular weight less than 50,000 g/mol, preferably less than 30,000 g/mol, more preferably less than 10,000 g/mol in the waterborne dispersion of the invention is preferably lower than 5 wt. %, more preferably lower than 2 wt. % and most preferably lower than 1 wt. %, relative to the total amount of polymer present in the waterborne dispersion.

The equivalent molar ratio of crosslinkable functional groups present in the crosslinker to crosslinkable functional groups present in the block copolymer and polymer P is preferably from 0.3 to 1.1, more preferably from 0.4 to 1.0 and even more preferably from 0.5 to 0.95. The equivalent molar ratio is calculated by dividing the molar amount of crosslinkable functional groups present in the crosslinker by the molar amount of crosslinkable functional groups present in the block copolymer and polymer P, which molar amounts are calculated from the amount of crosslinkable functional monomers (iii) which are used for preparing the block copolymer and polymer P and from the amount of crosslinker which is added to the coating composition. A preferred crosslinker is a polyhydrazide, preferably a dihydrazide functional compound (containing two hydrazide groups (O=C—NHNH$_2$)) with a molar mass below 1000 g/mole, preferably with a molar mass below 500 g/mole, more preferably with a molar mass below 250 g/mole, especially preferably adipic dihydrazide.

The block copolymer is obtained by a controlled radical polymerization. Examples of suitable controlled radical polymerization techniques to prepare the block copolymer are nitroxide-mediated radical polymerization (NMP), transition metal-mediated radical polymerization including for example atom transfer radical polymerization (ATRP) and single electron transfer radical polymerization (SET-LRP), and degenerative transfer techniques such as reversible addition-fragmentation chain transfer (RAFT) polymerization. The term "controlled radical polymerization" is to be understood as a specific radical polymerization process, also denoted by the term of "living radical polymerization" and "reversible deactivation radical polymerization", in which use is made of control agents, such that the polymer chains being formed are functionalized by end groups capable of being reactivated in the form of free radicals by virtue of reversible deactivation reactions. When preparing for example a block copolymer in the presence of the control agent, the end of the growing block is provided with a specific functionality that controls the growth of the block by means of reversible free radical deactivation. The functionality at the end of the block is of such a nature that it can reactivate the growth of the block in a second and/or third stage of the polymerization process with other ethylenically unsaturated monomers providing a covalent bond between for example a first and second block [A] and [B] and with any further optional blocks.

In the present invention, RAFT polymerization is the preferred controlled radical polymerization process to prepare the block copolymer. The RAFT polymerization process relies on the use of RAFT agents as control agents, which are well known to those skilled in the art. RAFT agents can be selected from the group consisting of dithioesters, thioethers-thiones, trithiocarbonates, dithiocarbamates, xanthates and mixtures thereof. Preferably the block copolymer of the invention is obtained from a RAFT process employing xanthates, dithiocarbamates and/or trithiocarbonates. Examples of preferred RAFT agents include dibenzyl trithiocarbonate (BM1361 from Boron Molecular; BlocBuilder DB from Arkema), O-ethyl-S-(1-methoxycarbonyl)ethyl dithiocarbonate (Rhodixan A1 from Solvay), S-1-dodecyl-S'-($\alpha,\alpha$'-dimethyl-$\alpha$'-acetic acid)trithiocarbonate, 2-methyl-2-((dodecylsulfanylthiocarbonyl)sulfanyl) butyl propionate (CTA-1 from Lubrizol), 3-((((1-carboxyethyl)thio)carbonothioyl)thio)propanoic acid (BM1429 from Boron Molecular), 4-cyano-4-(((dodecylthio)carbonothioyl)thio)pentanoic acid (BM1432 from Boron Molecular), 4-((((2-carboxyethyl)thio)carbonothioyl)thio)-4-cyanopentanoic acid (BM1433 from Boron Molecular), cyanomethyl (3,5-dimethyl-1H-pyrazole)-carbodithioate (BM1481 from Boron Molecular), 2-cyanobutanyl-2-yl 3,5-dimethyl-1H-pyrazole-1-carbodithioate (BM1542 from Boron Molecular), 2-cyanobutan-2-yl 4-chloro-3,5-dimethyl-1H-pyrazole-1-carbodithioate (BM1565 from Boron Molecular).

The RAFT polymerization process to prepare block [A] and or the block copolymer is preferably performed in solution. Solution polymerization is a polymerization process in which all or at least part of the reaction components including the monomer(s), initiator and control agent are dissolved in a non-monomeric liquid solvent at the start of the reaction. By non-monomeric is meant a solvent that does not comprise monomers, in other words that won't react as part of the polymerization. Usually the solvent is also able to dissolve the polymer or copolymer that is being formed. By a solvent is meant water, organic solvents or mixtures thereof. Preferred organic solvents include alcohols (such as ethanol, isopropanol, n-butanol, n-propanol, cyclohexanol), esters (such as ethyl acetate, propyl acetate, isopropyl acetate, butyl acetate), ketone solvents (such as acetone, methyl ethyl ketone, methyl isobutyl ketone), and glycols (such as butyl glycol). More preferred organic solvents include solvents selected from the group consisting of acetone, ethanol, methyl ethyl ketone, iso-propanol, ethyl acetate, butyl glycol and mixtures thereof. Preferably the solvent is water or a mixture of water and a suitable organic solvent like an alcohol.

In case organic solvent is applied for the controlled radical polymerization to prepare the block copolymer, preferably an organic solvent with a low boiling point and or a high evaporation rate is applied to allow fast removal of the organic solvent after the dispersion step under reduced pressure. Examples of such solvents include acetone, ethanol, isopropanol, methyl ethyl ketone and ethyl acetate.

Preferably block [B] is prepared in the presence of block [A]. In one embodiment of the invention, block [A] is prepared in an aqueous medium and the preparation of block [B] and of the polymer P are effected herein after. In another embodiment, the block copolymer is prepared in solution and thereafter dissolved or dispersed in water, and the preparation of the polymer P is effected herein after. Optionally suitable surfactants can be used to aid in the dispersion process.

Polymer P is preferably obtained by a radical emulsion polymerization effected in water and in the presence of block copolymer, where optionally the control agent functional group located at one of the chain ends of the block copolymer can be deactivated or removed prior to the preparation of polymer P. The control agent may optionally be (partially) deactivated or (partially) removed before or after dispersion of the block copolymer and before or after the polymer preparation. In case the control agent is (partially) deactivated or (partially) removed, deactivating or removing is preferably effected before feeding the monomers used to prepare polymer P. In case block [A] is prepared in the presence of block [B], the control agent functional group as located at the chain end of block [A] of the block copolymer is preferably deactivated or removed prior to the preparation of polymer P. In case block [B] is prepared in the presence of block [A], the control agent functional group as located at the chain end of block [B] of the block copolymer is preferably retained or only partly deactivated or only partly removed prior to the preparation of polymer P, resulting in that at least part of the polymer P chains will grow onto (i.e. become grafted) or become covalently attached to at least part of the block copolymer chains. When a RAFT agent is used as control agent, the chain end functionality of the block copolymer may be a (—S—C(=S)—) group or any group derived from the RAFT control agent (such as for example a thiol (—SH) group) that can provide covalent bond formation between the block copolymer and polymer P. When a RAFT agent is used as control agent the RAFT group can be deactivated or removed via for example oxidation reactions, radical induced reactions, hydrolysis, or aminolysis or any combination of such methods.

A waterborne emulsion polymerization process is, in itself, well known in the art and described in for example Handbook Emulsion Polymerization: Theory and Practice, 1975, by D. C. Blackley (ISBN 978-0-85334-627-2). Such a process involves polymerizing the monomers in a waterborne medium and conducting polymerization using a free-radical yielding initiator and (usually) appropriate heating (e.g. 30 to 120° C.) and agitation (stirring) being employed. The aqueous emulsion polymerization can optionally be effected using, in addition to the block copolymer, one or more conventional emulsifying agents, these being surfactants. Anionic, non-ionic, and anionic-non-ionic surfactants can be used, and also combinations of the three types; cationic surfactants can also be used. The amount of surfactant, relative to total monomers used to prepare polymer P, is preferably less than 1 wt. %, more preferably less than 0.5 wt. %, even more preferably less than 0.2 wt. % and especially preferably 0 wt. %. Emulsion polymerization can be initiated using thermally decomposing initiators or redox couple initiators. Typical thermally decomposing initiators include persulphate salts, such as sodium, potassium, or ammonium persulphate, or organic azo functional initiators, such as for instance 2,2'-Azobis(2-methylpropiononitrile) (AIBN), 2,2'-Azobis(2-methylbutyronitrile) (AMBN), 2,2'-Azobis[2-(2-imidazolin-2-yl)propane]dihydrochloride, or 4,4'-Azobis(4-cyanovaleric acid). When using these initiators, emulsion polymerization is typically initiated at temperatures between 60 and 100° C., more preferred between 70 and 95° C. Typically, the concentration of thermally decomposing initiators is chosen between 0.1 and 2 wt-%, based on total monomer weight used to prepare polymer P. Alternatively, radical polymerizations can also be started using redox reagents, where an oxidator, mostly peroxides, is reacted with a reductor, conveniently in the presence of a transition metal ion, yielding initiating radicals. Typical examples of peroxides may include hydrogen peroxide, t-butyl hydroperoxide, cumyl hydrogen peroxide, and the like. Reductors may be chosen from the group of i-ascorbic acid, sodium metabisulphite, Brugolite FF6, sodium formaldehyde sulphoxylate, fructose, and the like. As transition metal ion normally ferrous or ferric ions are chosen, often as iron EDTA complex. Redox couple initiation can typically be done at temperatures between 10 and 100° C., more conveniently between 20 and 90° C., depending on the choice of reactants. Redox couple initiators are typically used in concentrations between 0.05 and 1 wt. %, based on total monomer weight. The molecular weight of polymer P can be controlled by the use of well-known chain transfer agents. Preferred chain transfer agent is a mercaptan, selected from the group of dodecyl mercaptan, 3-mercaptopropionic acid, isooctyl thioglycolate, and 2-mercaptoethanol. More preferred no transfer agent other than the control agent is applied in the preparation of polymer P.

The present invention further relates to a process for preparing a waterborne dispersion as described above, whereby the process comprises at least the following steps:
(a) Preparing an amphiphilic block copolymer comprising at least blocks [A] and [B] in at least the following steps:
  a. subjecting at least ethylenically unsaturated monomer(s) (i) bearing water-soluble and/or water-dispersible functional groups to a controlled radical polymerization to obtain block [A],
  b. subjecting at least ethylenically unsaturated monomer(s) (ii) that is different from (i) to a controlled radical polymerization to obtain block [B],
  wherein block [A] is prepared in the presence of block [B] or wherein block [B] is prepared in the presence of block [A],
(b) optionally (step (b) is present in case at least a part of the water-soluble and/or water-dispersible functional groups are potentially ionic groups) converting at least part of the potentially ionic groups to ionic groups present in block [A] before, during or after preparation of block [B];
(c) conducting an emulsion polymerization process in water of at least an ethylenically unsaturated monomer(s) bearing crosslinkable functional groups (iii) different from (i) and (ii) in the presence of the block copolymer obtained in step (a) or step (b) (when present) to obtain the block copolymer-polymer P;
(d) adding a crosslinker to the block copolymer-polymer composition;
wherein the amount of the block copolymer is higher than 1 wt. % and lower than 30 wt. %, based on the total weight of monomers used to prepare the block copolymer-polymer composition;
the acid value of the block copolymer-polymer composition is higher than 1 and lower than 17 mg KOH per g of the block copolymer-polymer P composition.

Preferably, the process comprises at least the following steps:
(a) Preparing an amphiphilic block copolymer comprising at least blocks [A] and [B] in at least the following steps:
  a. subjecting at least ethylenically unsaturated monomer(s) (i) bearing water-soluble and/or water-dispersible functional groups to a controlled radical polymerization in water, organic solvent, or a mixture of water and organic solvent to obtain block [A],
  b. subjecting at least ethylenically unsaturated monomer(s) (ii) that is different from (i) in water, organic solvent, or a mixture of water and organic solvent to a controlled radical polymerization to obtain block [B],
wherein block [A] is prepared in the presence of block [B] or wherein block [B] is prepared in the presence of block [A],
(b) optionally (step (b) is present in case at least a part of the water-soluble and/or water-dispersible functional groups are potentially ionic groups) converting at least part of the potentially ionic groups to ionic groups present in the block copolymer;
(c) dispersing the block copolymer obtained in step (a) or step (b) (when present) in water, where preferably step (b) is at least partially combined with step (c);
(d) optionally removing the organic solvent from the dispersion obtained in step (c);
(e) conducting an emulsion polymerization process of at least an ethylenically unsaturated monomer(s) bearing crosslinkable functional groups (iii) different from monomers (i) and (ii) in the dispersion obtained in step (c) or (d) to obtain polymer P and the block copolymer-polymer composition, and
(f) adding a crosslinker to the block copolymer-polymer composition;
wherein the amount of the block copolymer is higher than 1 and lower than 30 wt. %, based on the total weight of monomers used to prepare the block copolymer-polymer composition; and
the acid value of the block copolymer-polymer composition is higher than 1 and lower than 17 mg KOH per g of block copolymer-polymer composition.

In case the water-soluble and/or water-dispersible functional groups are potentially ionic groups, step (b) must be present in the process of the invention. Conversion of potentially anionic water-soluble or water-dispersible functional groups such as acid groups into anionic groups such as carboxylate groups can be effected by deprotonating at least part of the water-soluble and/or water-dispersible functional groups. The deprotonating of at least part of the water-soluble and/or water-dispersible functional groups is preferably effected by neutralizing at least part of the potential water-dispersible and/or the potential water-soluble functional groups. Such neutralizing is preferably effected by addition of a suitable organic or inorganic base such as for example ammonia, triethylamine or sodium hydroxide. Preferred bases are volatile amines, such as ammonia. Conversion of potentially cationic water-soluble or water-dispersible functional groups such as amine groups into cationic groups such as quaternary amine groups can be effected by protonating at least part of the water-soluble and/or water-dispersible functional groups. Preferably step (b) is effected before step (c), during step (c), or before and during step (c). By converting at least part of the potentially ionic groups to ionic groups before, during or before and during step (c), the hydrophilicity and water solubility increases successively in line with the increasing degree of deprotonating of the water-dispersible/water-soluble functional groups. As the hydrophilicity and water solubility go up, block [A] respectively the block copolymer is able to act increasingly as a colloidal stabilizer for block [B] and polymer P respectively polymer P, and, towards the end of the emulsion polymerization, to stabilize the polymer dispersion.

In case step (a) is effected in the presence of organic solvent, the process according to the invention preferably comprises step (d), and step (e) is effected in the dispersion obtained in step (d).

The amount of block copolymer and polymer P present in the dispersion according to the invention is preferably >50 wt. %, based on total solids content of the dispersion. More preferably, the amount of block copolymer and polymer P present in the dispersion according to the invention is preferably higher than 50 wt. % and lower than or equal to 100 wt. %, based on total solids content of the dispersion. Even more preferably, the amount of block copolymer and polymer P present in the dispersion according to the invention is preferably higher than 65 and lower than or equal to 100 wt. %, even more preferably higher than 75 and lower than or equal to 100 wt. % and even more preferably higher than 80 and lower than 95 wt. %, based on total solids content of the dispersion. If desired the dispersion of the invention and or the waterborne coating composition of the invention further comprises other polymer(s) Q which are different than the block copolymer, polymer and block copolymer-polymer P composition as described above. Preferably polymer Q is a waterborne acrylic, urethane, urethane-acrylic, alkyd, alkyd-acrylic or any mixture thereof. The amount of the polymer Q is preferably ≥1 wt. % and ≤35 wt. % based on total solids content of block copolymer-polymer P and polymer Q together. More preferably, the amount of the polymer Q is preferably ≥5 wt. % and ≤25 wt. % based on total solids content of block copolymer-polymer P and polymer Q together. The advantage of the additional presence of polymer(s) Q is that a further improvement can be obtained in the final coating properties in terms of resistance to blocking, resistance to chemicals, abrasion resistance, impact resistance, hardness and or adhesion when the polymer composition is applied onto a substrate. In a special embodiment, the coating composition of the invention further comprises a water-based fluoro polymer up to 50 wt % of fluoro polymer, more preferably up to 40 wt %, most preferably up to 30 wt % based on total solids content of block copolymer-polymer P and fluoro polymer together in the final coating composition to improve the durability of the coating system. Examples of suitable water-based fluoro polymers are the Kynar Aquatec emulsions available from Arkema.

Preferably the dispersed particles present in the dispersion according to the invention have an average particle size as determined via Dynamic Light Scattering from 20 to 500 nm, more preferably from 40 to 200 nm, most preferably from 50 to 150 nm.

The present invention further relates to a coating composition comprising the waterborne dispersion as described above or comprising the waterborne dispersion obtained with the process as described above. The waterborne dispersion of the invention preferably has a minimum film forming temperature of from 10 to 60° C., more preferably from 20 to 50° C., even more preferably from 25 to 40° C. The coating composition preferably comprises a predominantly aqueous liquid carrier, and preferably less than 6%, more preferably less than 5.2%, most preferably less than 2% by weight based on the total coating composition of a solvent with a boiling point below 280° C. at atmospheric pressure.

The coating composition according to the present invention may further and preferably comprises pigment in an amount such that the pigment volume concentration as measured as a percentage of the total volume of non-volatile material (having a boiling point at atmospheric pressure above 280° C.) is preferably from 0 to 60, more preferably from 2 to 50, most preferably from 15 to 40, especially preferably from 18 to 30 volume-%, relative to the volume of non-volatile material in the coating composition. As pigments, inorganic and/or organic pigments can be used. As such, pigments are defined as non-film forming particles, with a Tg above 60° C.

Examples of pigments are titanium dioxide, silica, iron oxides, aluminosilicates, talc, mica, calcium carbonate, barium sulfate, Lithopone, zinc sulfide, zirconium oxide, organic colorants; colorants based on mixed metal oxides such as those supplied by Shepherd, and carbon black. Preferably the coating composition comprises titanium dioxide, preferably from 15 to 40, more preferably from 18 to 30 volume-%, relative to the volume of non-volatile material in the coating composition. The coating composition according to the invention may further comprise a coalescent agent; a non-volatile plasticizing solvent; a rheology modifier; voided or hollow polymers such as Ropaque™ Ultra; a thickening agent; an antifoam agent; a wetting agent; an adhesion promotor such as a phosphate ester, titanate, silane, or zirconate; a flow and levelling agent; a biocide; a water soluble dye; a wax; a heat stabilizer; a UV absorber; a free radical scavenger; a matting agent; a phosphate flash rust inhibitor such as diammonium phosphate; and an antioxidant.

The present invention further relates to a method of coating a substrate comprising the steps of (1) applying the coating composition as described above to a substrate and (2) drying the coating composition at a temperature preferably below 100° C. to obtain a coated article. The present invention further relates to an article having a coating deposited thereon, wherein the coating is obtained by depositing a coating composition as described above to a substrate and drying the coating composition. The disclosed coating compositions may be applied to a variety of substrates, including metals, plastics, wood, cement, concrete, stone, glass, ceramics, paper and cardboard. Representative plastic substrates include PVC, polystyrene (PS), thermoplastic polyolefins (TPOs) including polyethylene (PE) and polypropylene (PP), acrylonitrile-butadiene-styrene (ABS), polycarbonate (PC), nylon, polyethylene terephthalate (PET) and other polyesters including filled polyesters. Representative wood substrates include hardwood species such as ash, birch, cherry, mahogany, maple, oak, poplar, teak, hickory and walnut, and softwood species such as cedar, fir, pine and redwood. The wood substrate may be solid or veneered.

The disclosed coating compositions are especially well-suited for application by building component manufacturers at a building component manufacturing site. The resulting coated building components typically will be dried at ambient or elevated temperature, stored and then shipped to distributors or end users for eventual installation on buildings or other architectural objects or structures. Alternatively, the coating can be applied directly on installed building components.

Suitable building product substrates include aluminum, aluminum alloys, zinc-aluminum alloys, steel (including coiled rolled steel, galvanized steel, zinc-aluminum coated steel and aluminum plated steel), wood, veneer, wood composite, particle board, medium density fiberboard, and vinyl such as PVC. The substrate preferably comprises aluminum. From the viewpoint of adhesion and rust preventing effect, it is preferred that the aluminum substrate is subjected to pre-treatment such as surface preparation and chemical conversion treatment. Surface preparation is for example carried out by dipping into an aqueous solution of surface modifier or by spraying thereof. Chemical conversion treatment is carried out preferably by dipping in zinc phosphate, iron phosphate, chromate, chromic acid or phosphate chromate or by spraying thereof. Hence, the coating composition of the invention is preferably applied on pre-treated aluminum, more preferably chromated aluminum. The substrate may be pre-coated with a primer.

The coated article is preferably a profile for an architectural article, more preferably a door frame, a window frame or door panel. It has surprisingly been found that with the coating composition according to the invention, coatings can be obtained which are capable of forming a coating satisfying at least the detergent resistance test described in AAMA 2604-17, section 8.7.4 and the detergent resistance test described in AAMA 2605-17, section 8.7.4.

The present invention is now illustrated by the following examples. Unless otherwise specified all parts, percentages, and ratios are on a weight basis.

In the examples, the following abbreviations and terms are specified:
DP=degree of polymerization
AA=acrylic acid
MAA=methacrylic acid
MMA=methyl methacrylate
BMA=butyl methacrylate
BA=butyl acrylate
DAAM=diacetone acrylamide
ADH=adipic dihydrazide
AMBN=2,2-azobis(2-methylbutyronitrile)
MEK=methyl ethyl ketone
SLS=sodium lauryl sulfate (surfactant)
APS=ammonium persulfate All number- and weight average molecular weights (Mn and Mw) and polydispersity index PDI (=Mw/Mn) data are determined by SEC analysis. The SEC analyses were performed on an Alliance Separation Module (Waters 2690), including a pump, autoinjector, degasser, and column oven. The eluent was N-methylpyrrolidone (NMP) with the addition of 0.01 M LiBr and 8 volume-% hexafluoroisopropanol. The injection volume was 150 µl. The flow was established at 1.0 ml/min. Three PL gel Mixed B columns were used with a differential refractive index detector (Waters 410). The sample solutions were prepared with a concentration of 5 mg solids in 1 ml NMP (with 0.01 M LiBr and 8 volume-% hexafluoroisopropanol), and the samples were dissolved for a period of 24 hours. Calibration is performed with polystyrene standards (polymer standard services), ranging from 500 to 2,000,000 g/mol. The calculation was performed with Empower 3 software (Waters) with a third order calibration curve. The obtained molar masses are polystyrene equivalent molar masses (g/mol).

The viscosity is measured on a Brookfield viscometer (DV-I™ Viscometer from Brookfield Engineering) using the appropriate spindle at 60 rpm.

The particle size is measured by Dynamic Light Scattering (DLS) using a Malvern Zetasizer S-90.

The average degree of polymerization (DP) x (or y) is a theoretical value as calculated from the starting recipe by dividing the total molar amount of monomers in block [A] (or [B]) by the total molar amount of RAFT agent, assuming full conversion of all monomers and RAFT agent.

The glass transition temperature Tg is calculated theoretically using the well-known Fox equation where the Tg (in Kelvin) of a copolymer having "n" copolymerized comonomers is given by the weight fractions "w" and the Tg values of the respective homopolymers (in Kelvin) of each comonomer type according to the equation $$1/T_g = w_1/Tg_1 + w_2/Tg_2 + \ldots w_n/Tg_n.$$

The calculated Tg in Kelvin may be readily converted to ° C. In case the block copolymer is a diblock copolymer $[A]_x[B]_y$, the calculation is based on the total of monomers in block [A] and [B] together.

The acid value (mg KOH/g final polymer composition) of the Examples and Comparative Examples is calculated according to the formula AV=((total molar amount of acid functional monomer charged in the polymerization processes to prepare the Oligomer (if any) and the Polymer per gram of total amount of monomers charged in the polymerization processes to prepare the Oligomer and the Polymer)*56.1*1000).

An overview of the Examples (EX) and the Comparative Examples (CE) is given in Table 1, where: oligomer is a block copolymer or a statistical copolymer, oligomer wt % is the amount of oligomer based on total amount of oligomer and polymer, and the acid value is of the final polymer composition (calculated on the total weight of monomers used to prepare the oligomer and polymer) in mg KOH/g final polymer composition. % refers to weight %, relative to the total weight of monomers used to prepare the oligomer and polymer.

TABLE 1

| | Oligomer (DP) [Tg] | Polymer (% DAAM) [Tg] | Oligomer wt % | Acid value (mg KOH/g final polymer composition) |
|---|---|---|---|---|
| EX1 | 1 = MAA-MMA (25-100) [122° C.] | BMA/MMA/BA/DAAM (3%) [20° C.] | 5 | 6 |
| EX2 | 1 = MAA-MMA (25-100) [122° C.] | BMA/MMA/BA/DAAM (3%) [20° C.] | 10 | 12 |
| EX3 | 2 = MAA-MMA/BMA (25-74/26) [90° C.] | BMA/MMA/BA/DAAM (3%) [20° C.] | 5 | 5 |
| EX4 | 3 = MAA-MMA/BMA/DAAM (20-127/12/6) [101° C.] | BMA/MMA/BA/DAAM (3%) [20° C.] | 7.5 | 5 |
| CE1 | 1 = MAA-MMA (25-100) [122° C.] | BMA/MMA/BA/DAAM (3%) [20° C.] | 1 | 1 |
| CE2 | 1 = MAA-MMA (25-100) [122° C.] | BMA/MMA/BA/DAAM (3%) [20° C.] | 15 | 17 |
| CE3 | 1 = MAA-MMA (25-100) [122° C.] | BMA/MMA/BA [20° C.] | 5 | 6 |
| CE4 | 1 = MAA-MMA (25-100) [122° C.] | BMA/MMA/BA/DAAM (0.5%) [20° C.] | 5 | 6 |
| CE5 | 4 = AA-BA/DAAM (20-30/10) [−8° C.] | MMA/BA [10° C.] | 4 | 7 |

TABLE 1-continued

|  | Oligomer (DP) [Tg] | Polymer (% DAAM) [Tg] | Oligomer wt % | Acid value (mg KOH/g final polymer composition) |
|---|---|---|---|---|
| CE6 | 5 = AA-iBOA (20-50) [95° C.] | BMA/BA [0° C.] | 16 | 15 |
| CE7 | 6 = MAA/MMA statistical copolymer [115° C.] | BMA/MMA/BA/DAAM (3%) [20° C.] | 30 | 19 |
| CE8 | none (0.2% surfactant) | BMA/MMA/BA/MAA(0.9%)/ DAAM(3%) [20° C.] | — | 6 |
| CE9 | none (1.4% surfactant) | BMA/MMA/BA/MAA(5%)/ DAAM(3%)[20° C.] | — | 33 |

Oligomers 1, 2 and 3 were synthesized by RAFT polymerization where 4-cyano-4-(((dodecylthio)carbonothioyl) thio)pentanoic acid (BM1432, available from Boron Molecular) was applied as RAFT agent.

Oligomer 1

Synthesis of a [A]x-[B]y diblock copolymer where block [A] is based on MAA and x=25 and block [B] is based on MMA with y=100:

404 gram ethanol and 77.0 gram (0.19 mol) RAFT agent were added to a 2 L flask equipped with condenser cooler, temperature measuring probe and mechanical stirring device. The reaction mixture was degassed by purging with nitrogen at ambient temperature for 20 minutes while stirring. The temperature was then raised to 75° C. and 30% of a monomer feed mixture of 411 gram (4.77 mol) MAA and 431 gram ethanol was added to the reaction mixture. Then at 75° C. 25% of an initiator mixture of 2.4 gram AMBN and 76 gram MEK was added. The reaction mixture was then kept for 5 minutes at 75° C. followed by the gradual addition of the remaining 70% of the monomer feed mixture over 2 hours, after which the mixture was kept for 10 hours at 75° C. The remaining initiator mixture was added in 3 shots of 25% at 100, 200 and 300 minutes after the start of the monomer feed. The reaction mixture was then cooled to 20° C. and a sample was withdrawn for further analysis. The conversion of MAA as determined with liquid chromatography was 97.5% and the solids level was determined at 37.5%. SEC analysis resulted in the following values: Mn=4200 g/mol, PDI=1.16.

For preparing the diblock copolymer, 365 gram of the obtained PMAA block [A] reaction mixture corresponding to 53.6 mmol of block [A] based on a solids level of 37.5% and a theoretical molecular weight of 2556 g/mol, was charged to a 2 L flask equipped with condenser cooler, temperature measuring probe and mechanical stirring device. The reaction mixture was degassed by purging with nitrogen for 20 minutes while stirring. The temperature was then raised to 75° C. and 25% of a mixture of 2.1 gram AMBN and 91 gram MEK was added, followed by the gradual addition of a monomer feed mixture of 536 gram (5.35 mol) MMA and 62 gram MEK. The monomer feed addition lasted 3 hours under a nitrogen atmosphere and at a controlled temperature of 75° C. The remaining initiator mixture was then added in 3 shots of 25% at 100, 200 and 360 minutes after the start of the monomer feed. After completion of the feed, a mixture of 282.8 gram MEK and 161.0 gram ethanol was fed to the reactor in 1 hour, after which the mixture was kept for about 8 hours at 75° C. The reaction mixture was then cooled to 20° C. and a sample was withdrawn for further analysis. The conversion of MMA as determined with gas chromatography was found to be 94.1% and the solids level was determined at 48.8%. SEC analysis of oligomer 1 resulted in the following values: Mn=12200 g/mol, PDI=1.20.

An aqueous dispersion of oligomer 1 was prepared as follows: a mixture of 1183 gram deionized water and 32.5 gram ammonia (25%) was fed in 10 minutes to a mixture of approximately 600 gram oligomer 1, 35 gram MEK and 35 gram ethanol and 8 gram ammonia (25%) at 23° C. An additional amount of 350 gram deionized water was added and the residual organic solvents were removed by distillation. A stable aqueous dispersion was obtained of which the pH was adjusted to 7.2 by addition of ammonia, and the solids content was adjusted with extra deionized water to 14.1%. The obtained dispersion had an average particle size of 35 nm as determined with Dynamic Light Scattering.

Oligomer 2

Synthesis of a [A]x-[B]y diblock copolymer where block [A] is based on MAA and x=25 and block [B] is based on MMA and BMA with y=100 (DP MMA=74; DP BMA=26):

The synthesis of oligomer 2 was performed using a similar recipe and procedure as for oligomer 1, where the monomer feed mixture for preparing block [B] was changed from MMA (100 mole %) to MMA/BMA (74/26 mole %). The conversion of MAA for the block [A] preparation as determined with liquid chromatography was 96.7% and the solids level was determined at 35.4%. SEC analysis resulted in the following values: Mn=4300 g/mol, PDI=1.14. For block [B], the conversion of MMA and BMA as determined with gas chromatography was found to be 87% and 89% respectively, and the solids level was determined at 42.4%. SEC analysis of oligomer 2 resulted in the following values: Mn=11700 g/mol, PDI=1.21.

An aqueous dispersion of oligomer 2 was prepared as follows: 19.6 gram ammonia (25%) was fed in 10 minutes to a mixture of approximately 373 gram oligomer 2 and 47 gram MEK at 30° C. Reaction mixture was stirred for 10 minutes and then 738 gram deionized water was fed to the reactor in 30 minutes at 30° C., followed by an additional amount of 75 gram deionized water. The pH was then increased to 8.3 via additional of some ammonia and the residual organic solvents were removed by distillation. Additional deionized water was added to reduce the viscosity. A stable aqueous dispersion was obtained with a solids content of 17.2%. The obtained dispersion had an average particle size of 37 nm as determined with Dynamic Light Scattering.

Oligomer 3

Synthesis of a [A]x-[B]y diblock copolymer where block [A] is based on MAA and x=20 and block [B] is based on MMA, BMA and DAAM with y=145 (DP MMA=127; DP BMA=12, DP DAAM=6):

322 gram ethanol and 79.5 gram (0.197 mol) RAFT agent were added to a 2 L flask equipped with condenser cooler, temperature measuring probe and mechanical stirring device. The reaction mixture was degassed by purging with nitrogen at ambient temperature for 20 minutes while stirring. The temperature was then raised to 70° C. and 30% of a monomer feed mixture of 339 gram (3.94 mol) MAA and 339 gram ethanol was added to the reaction mixture, followed by addition of an initiator mixture of 1.9 gram AMBN and 32 gram MEK. The reaction mixture was then heated to 75° C. followed by the gradual addition of the remaining 70% of the monomer feed mixture over 2 hours, after which about 90 gram MEK was added. The reaction mixture was then kept for 4 hours at 75° C. An initiator mixture of 0.2 gram of AMBN and 10 gram MEK was then added and the reaction mixture was kept for 6 hours at 75° C. The reaction mixture was then cooled to 20° C. and a sample was withdrawn for further analysis. The conversion of MAA as determined with liquid chromatography was 94.3% and the solids level was determined at 35.5%.

For preparing the diblock copolymer, 440 gram of the obtained PMAA block [A] mixture corresponding to 73.5 mmol of block [A] based on a solids level of 35.5% and a theoretical molecular weight of 2125 g/mol, and 274 gram MEK was charged to a 2 L flask equipped with condenser cooler, temperature measuring probe and mechanical stirring device. The reaction mixture was degassed by purging with nitrogen for 20 minutes while stirring. The temperature was then raised to 75° C. and a mixture of 3.1 gram of AMBN and 67 gram of MEK was added, followed by the gradual addition of a monomer feed mixture of 938 gram (9.37 mol) of MMA, 126 gram (0.89 mol) of BMA and 75.4 gram (0.45 mol) of DAAM. The monomer feed addition lasted 2 hours under a nitrogen atmosphere and at a controlled temperature of 75° C. After completion of the feed, 675 gram MEK was fed to the reactor in 90 minutes, after which the mixture was kept for 30 minutes at 75° C. Then 50% of a mixture of 0.6 gram AMBN and 20 gram MEK was added and the reaction mixture was kept for 4 hours at 75° C. The remaining 50% of initiator mixture was then added and the mixture was kept for 3 hours at 75° C., after which the reaction mixture was cooled to 20° C. and a sample was withdrawn for further analysis. The conversion of MMA and BMA as determined with gas chromatography was found to be 95.1% and 95.9%, respectively, and the solids level was determined at 48.3%. SEC analysis of oligomer 3 resulted in the following values: Mn=13300 g/mol, PDI=1.57.

An aqueous dispersion of oligomer 3 was prepared as follows: 13.5 gram ammonia (25%) was added in 10 minutes to a mixture of approximately 1812 gram oligomer 3, 66 gram MEK and 66 gram ethanol at 20° C. The reaction mixture was stirred for 10 minutes and then a mixture of 60.8 gram ammonia (25%) and 2576 gram deionized water was fed to the reactor in 20 minutes at 25° C. The residual organic solvents were removed by distillation and the pH was set to 8.3 with addition of some ammonia (25%). A stable aqueous dispersion was obtained with a solids content of 24.1%. The obtained dispersion had an average particle size of 45 nm as determined with Dynamic Light Scattering.

Oligomer 4

Synthesis of a [A]x-[B]y diblock copolymer where block [A] is based on AA and x=20 and block [B] is based on BA and DAAM with y=40 (DP BA=30; DP DAAM=10) is performed according the same recipe and procedure as disclosed in WO2009090252 (Block copolymer 1 in Example 1). SEC analysis of oligomer 4 resulted in the following values: Mn=6490 g/mol, PDI=1.36.

An aqueous dispersion of oligomer 4 was prepared according the same recipe and procedure as disclosed in WO2009090252 (Block copolymer 1). The resulting aqueous dispersion had a pH of 7.3 and a solids content of 19.3%. The obtained dispersion had an average particle size of 25 nm as determined with Dynamic Light Scattering.

Oligomer 5

Synthesis of a [A]x-[B]y diblock copolymer where block [A] is based on AA and x=20 and block [B] is based on isobornyl acylate (iBOA) with y=50 is performed according the same recipe and procedure as disclosed in WO2009121911 (Block copolymer 1 in Example 1). SEC analysis of oligomer 5 resulted in the following values: Mn=4980 g/mol, PDI=1.72. An aqueous dispersion of oligomer 5 was prepared according the same recipe and procedure as disclosed in WO2009121911 (Block copolymer 1). The resulting aqueous dispersion had a pH of 8.1 and a solids content of 25.7%. The obtained dispersion had an average particle size of 44 nm as determined with Dynamic Light Scattering.

Oligomer 6

Synthesis of a statistical copolymer of MAA and MMA: 557 gram of MEK was added to a 2 L flask equipped with condenser cooler, temperature measuring probe and mechanical stirring device. The reaction mixture was degassed by purging with nitrogen at ambient temperature for 20 minutes while stirring. The temperature was then raised to 78° C. and 20% of a monomer feed mixture of 514 gram MMA, 57 gram MAA and 15.7 gram dodecyl mercaptan was added to the reaction mixture. Then at 78° C. 25% of an initiator mixture of 13.4 gram AMBN and 43 gram MEK was added. The reaction mixture was then kept for 5 minutes at 78° C. followed by the gradual addition of the remaining 70% of the monomer feed mixture over 6 hours. The remaining initiator mixture was added in 3 shots of 25% at 2, 4 and 6 hours after start of the monomer feed. After the monomer feed the mixture was kept for 2 hours at 78° C. and then cooled to 20° C. The conversion of MAA as determined with liquid chromatography was 98.1%, the conversion of MMA as determined with gas chromatography was found to be 98.7% and the solids level was determined at 55.4%. SEC analysis of oligomer 6 resulted in the following values: Mn=6220 g/mol, PDI=1.84. An aqueous solution of oligomer 6 was prepared as follows: 5.8 gram ammonia (25%) was added in 10 minutes to a mixture of approximately 677 gram oligomer 6 and 157 gram MEK at 20° C. The reaction mixture was stirred for 5 minutes and then a mixture of 23.0 gram ammonia (25%) and 1131 gram deionized water was fed to the reactor in 20 minutes at 25° C. The residual organic solvents were removed by distillation. A stable aqueous solution was obtained with a pH of 8.3 and a solids content of 24.3%. Analysis with Dynamic Light Scattering did not result in a measurable particle size.

EXAMPLE 1

434 gram of deionized water and 209 gram of the aqueous dispersion of oligomer 1 (14.1% in water) were added to a 2 L flask equipped with stirrer, condenser cooler and temperature measuring probe. The reaction mixture was heated while stirring to 85° C. under nitrogen atmosphere. Then a pre-emulsified monomer mixture consisting of in total 171 gram deionized water, 3.7 gram SLS (30 wt % in water), 430.8 gram BMA, 63.2 gram MMA, 48.7 gram BA and 16.8 gram DAAM was gradually added over a time period of 2 hours. In parallel to this feed, an initiator mixture of 1.6 gram APS and 63.6 gram deionized water set at a pH of about 8 with ammonia was added over a time period of 2 hours. At the end of both feeds the reaction mixture was mixed for 30 more minutes at 85° C. A post reaction with tert-butyl hydroperoxide and isoascorbic acid was then performed to react any residual monomer. The resultant emulsion was then cooled to room temperature and a sample was taken for SEC analysis. Following, a mixture of 6.9 gram ADH and 23.4 gram deionized water was added while mixing for 5 more minutes. The pH of the latex was set to about 8 by addition of ammonia.

Examples 2, 3, 4 and Comparative Examples 1 and 2 were prepared according a similar recipe and procedure as applied for Example 1, where only the type and amount of oligomer (on total polymer weight) was varied. An additional amount of deionized water was added during processing to reduce the viscosity as needed to ensure good mixing.

Comparative Examples 3 and 4 were prepared according a similar recipe and procedure as applied for Example 1, where only the amount of DAAM in the monomer mixture was varied from 3% (Example 1) to 0% (Comparative Example 3) or 0.5% (Comparative Example 4), and the amount of ADH relative to the total amount of DAAM in the oligomer polymer composition was kept constant, meaning that Comparative Example 3 did not contain any ADH.

Comparative Example 5 was synthesized according the same recipe and procedure as disclosed in WO2009090252 (Example 1).

Comparative Example 6 was synthesized according the same recipe and procedure as disclosed in WO2009121911 (Example 2).

Comparative Example 7 was prepared according a similar recipe and procedure as applied for Example 1, where the amount of oligomer 6 was initially varied from 5% to 15% and 30%, yet use of oligomer 6 at 5% and 15% resulted in significant fouling and grit formation during preparation of the emulsion polymer and synthesis of these binders could not be completed. At 30% oligomer 6 the fouling was still significant, but the synthesis could be completed. Over time however this binder showed settling (unstable), meaning that this binder was unsuited for further evaluation. Clearly, these surprising results show that a block copolymer is much more effective in emulsion particle stabilization than a statistical copolymer, and that use of a block copolymer at the same time results in an excellent detergent resistance performance following the test as described in section 8.7.4 of AAMA 2604-17 and AAMA 2605-17 specifications.

Comparative Example 8 (CE8)

CE8 is an emulsion polymer that does not contain an oligomer but is based on the same overall composition as Example 1, meaning it has the same low acid amount (0.9 wt %) and low surfactant amount (0.2%) as used in Example 1. The overall monomer composition of CE8 is similar to the combined monomer composition of the oligomer and polymer of Example 1. CE8 was synthesized as follows: 736 gram of deionized water was added to a 2 L flask equipped with stirrer, condenser cooler and temperature measuring probe, and heated to 70° C. while stirring under nitrogen atmosphere. Then 10 wt % of a pre-emulsified monomer mixture consisting of in total 205 gram deionized water, 4.5 gram SLS (30 wt % in water), 517.8 gram BMA, 104.1 gram MMA, 58.5 gram BA, 20.2 gram DAAM and 6.4 gram MAA was added to the reactor. The temperature of the reactor was kept for 5 minutes at 70° C. and then 10 wt % of an initiator mixture of 1.9 gram APS and 76.4 gram deionized water was added to start the seed formation. After 15 minutes the reaction mixture was further heated to 85° C. and then the remaining 90 wt % of monomer and initiator mixture feed was fed to the reactor over a time period of 2 hours. At the end of both feeds the reaction mixture was mixed for 30 minutes at 85° C. A post reaction with tert-butyl hydroperoxide and isoascorbic acid was then performed to react any residual monomer. The resultant emulsion was then cooled to room temperature and a sample was taken for SEC analysis. The pH of the latex was then set to about 8 by addition of ammonia and a mixture of 8.3 gram ADH and 28.2 gram deionized water was added while mixing for 5 more minutes.

Comparative Example 9 (CE9)

CE9 is an emulsion polymer that does not contain an oligomer but is based on a surfactant amount (1.4 wt %) and acid monomer amount (5 wt %) that is typically applied for conventional emulsion polymers. CE9 was synthesized as follows: 720 gram of deionized water and 28.8 gram SLS (30% in water) was added to a 2 L flask equipped with stirrer, condenser cooler and temperature measuring probe, and heated to 70° C. while stirring under nitrogen atmosphere. Then 10 wt % of a pre-emulsified monomer mixture consisting of in total 203 gram deionized water, 4.4 gram SLS (30 wt % in water), 512 gram BMA, 49.1 gram MMA, 82.9 gram BA, 19.9 gram DAAM and 34.9 gram MAA was added to the reactor. The temperature of the reactor was kept for 5 minutes at 70° C. and then 10 wt % of an initiator mixture of 1.9 gram APS and 75.5 gram deionized water was added to start the seed formation. After 15 minutes the reaction mixture was further heated to 85° C. and then the remaining 90 wt % of monomer and initiator mixture feed was fed to the reactor over a time period of 2 hours. At the end of both feeds the reaction mixture was mixed for 30 minutes at 85° C. A post reaction with tert-butyl hydroperoxide and isoascorbic acid was then performed to react any residual monomer. The resultant emulsion was then cooled to room temperature and a sample was taken for SEC analysis. The pH of the latex was then set to about 8 by addition of ammonia and a mixture of 8.2 gram ADH and 27.8 gram deionized water was added while mixing for 5 more minutes.

The specifications of the prepared emulsion polymers are given in Table 2. Solids level was gravimetrically determined. Viscosity of the binder was measured within 48 hours after synthesis, indicated as the initial viscosity, and after 6 months storage at room temperature, to determine shelf-stability. Final free monomer levels were all below 500 ppm.

TABLE 2

| Example | Solids [%] | pH [—] | Initial viscosity (Brookfield) [mPa · s] | Viscosity after 6 months (Brookfield) [mPa · s] | Particle size (DLS) [nm] | Mn/Mw (SEC) [kg/mol] |
|---|---|---|---|---|---|---|
| EX1 | 33.4 | 8.1 | 93 | 84 | 65 | 60/170 |
| EX2 | 29.3 | 8.1 | 900 | 906 | 59 | 40/116 |
| EX3 | 34.2 | 8.2 | 81 | 90 | 70 | not available |
| EX4 | 39.4 | 8.2 | 76 | 76 | 92 | 63/187 |
| CE1 | 39.6 | 8.2 | 20 | 23 | 109 | 90/314 |
| CE2 | 26.5 | 8.1 | 1200 | 1442 | 51 | 35/97 |
| CE3 | 34.6 | 8.1 | 182 | 180 | 63 | 58/164 |
| CE4 | 34.3 | 8.1 | 176 | 173 | 65 | 60/167 |
| CE5 | 34.9 | 8.3 | 66 | 67 | 69 | 49/333 |

TABLE 2-continued

| Example | Solids [%] | pH [-] | Initial viscosity (Brookfield) [mPa·s] | Viscosity after 6 months (Brookfield) [mPa·s] | Particle size (DLS) [nm] | Mn/Mw (SEC) [kg/mol] |
|---|---|---|---|---|---|---|
| CE6 | 36.1 | 8.5 | 118 | 168 | 77 | 23/194 |
| CE7 | 33.5 | 8.0 | 49 | 47 | 76 | not available |
| CE8 | 39.3 | 8.2 | 5 | 5 | 337 | 118/543 |
| CE9 | 39.0 | 8.0 | 32 | 27 | 104 | 125/354 |

White pigmented formulations of the examples (EX) and comparative examples (CE) were prepared using the ingredients and amounts (in grams) as listed in Table 3. All white pigmented formulations (denoted as PF) were prepared at a target total VOC content of around 150 g/L. The weighed amount of binder was adjusted relative to the solids content to ensure that each formulation contained the same level of binder on total formulation solids. The pigment volume concentration (PVC) was set at 20-21%. For preparation of the formulations, a let down was prepared by slowly adding the listed formulation ingredients (coalescing agents, wetting agent, deionized water, and neutralizing agent) as pre-mix to the binder under adequate agitation, followed by 15 minutes mixing. The mill base dispersion was separately prepared from mixing the deionized water, ZetaSperse 3600, Airase 5200 and Kronos 2160 under high shear for 15-20 minutes. This mill base dispersion was then added to the let down under adequate agitation, followed by some defoamer (Byk 024) and 15 minutes mixing. The viscosity of the formulation was then adjusted to about 400 mPa·s with (part of) the indicated amounts of rheology modifiers (Acrysol RM-8W and RM-12W) to enable spray application.

TABLE 3

|  | EX1-PF | EX2-PF | EX3-PF | EX4-FP | CE1-PF | CE2-PF | CE3-PF | CE4-PF | CE5-PF | CE6-PF | CE8-PF | CE9-PF |
|---|---|---|---|---|---|---|---|---|---|---|---|---|
| Let down | | | | | | | | | | | | |
| EX1 | 672.6 | — | — | — | — | — | — | — | — | — | — | — |
| EX2 | — | 766.7 | — | — | — | — | — | — | — | — | — | — |
| EX3 | — | — | 656.8 | — | — | — | — | — | — | — | — | — |
| EX4 | — | — | — | 570.1 | — | — | — | — | — | — | — | — |
| CE1 | — | — | — | — | 567.3 | — | — | — | — | — | — | — |
| CE2 | — | — | — | — | — | 847.7 | — | — | — | — | — | — |
| CE3 | — | — | — | — | — | — | 649.2 | — | — | — | — | — |
| CE4 | — | — | — | — | — | — | — | 654.9 | — | — | — | — |
| CE5 | — | — | — | — | — | — | — | — | 643.7 | — | — | — |
| CE6 | — | — | — | — | — | — | — | — | — | 622.2 | — | — |
| CE8 | — | — | — | — | — | — | — | — | — | — | 571.6 | — |
| CE9 | — | — | — | — | — | — | — | — | — | — | — | 575.9 |
| Butyl Cellosolve [1] | 30.5 | 30.5 | 30.5 | 30.5 | 30.5 | 30.5 | 30.5 | 30.5 | 30.5 | 30.5 | 30.5 | 30.5 |
| Dowanol DPnB [2] | 17.3 | 17.3 | 17.3 | 17.3 | 17.3 | 17.3 | 17.3 | 17.3 | 17.3 | 17.3 | 17.3 | 17.3 |
| Troysol LAC [3] | 6.8 | 6.8 | 6.8 | 6.8 | 6.8 | 6.8 | 6.8 | 6.8 | 6.8 | 6.8 | 6.8 | 6.8 |
| Deionized water | 47.8 | 47.8 | 47.8 | 69.8 | 72.7 | 47.8 | 47.8 | 47.8 | 59.0 | 80.4 | 68.5 | 64.0 |
| Ammonia (28%) | 1.2 | 1.2 | 1.2 | 1.2 | 1.2 | 1.2 | 1.2 | 1.2 | 1.2 | 1.2 | 1.2 | 1.2 |
| Total let down | 776.2 | 870.3 | 760.5 | 695.7 | 695.8 | 951.3 | 752.8 | 758.5 | 758.5 | 758.4 | 695.9 | 695.7 |
| Mill base dispersion | | | | | | | | | | | | |
| Deionized water | 37.5 | 37.5 | 37.5 | 37.5 | 37.5 | 37.5 | 37.5 | 37.5 | 37.5 | 37.5 | 37.5 | 37.5 |
| ZetaSperse 3600 [4] | 23.7 | 23.7 | 23.7 | 23.7 | 23.7 | 23.7 | 23.7 | 23.7 | 23.7 | 23.7 | 23.7 | 23.7 |
| Airase 5200 [5] | 1.0 | 1.0 | 1.0 | 1.0 | 1.0 | 1.0 | 1.0 | 1.0 | 1.0 | 1.0 | 1.0 | 1.0 |
| Kronos 2160 [6] | 189.5 | 189.5 | 189.5 | 189.5 | 189.5 | 189.5 | 189.5 | 189.5 | 189.5 | 189.5 | 189.5 | 189.5 |
| Total mill base dispersion | 251.7 | 251.7 | 251.7 | 251.7 | 251.7 | 251.7 | 251.7 | 251.7 | 251.7 | 251.7 | 251.7 | 251.7 |
| BYK 024 [7] | 0.5 | 0.5 | 0.5 | 0.5 | 0.5 | 0.5 | 0.5 | 0.5 | 0.5 | 0.5 | 0.5 | 0.5 |
| Acrysol RM-8W [8] | 26.0 | 26.0 | 26.0 | 26.0 | 26.0 | 26.0 | 26.0 | 26.0 | 26.0 | 26.0 | 26.0 | 26.0 |
| Acrysol RM-12W [8] | 26.0 | 26.0 | 26.0 | 26.0 | 26.0 | 26.0 | 26.0 | 26.0 | 26.0 | 26.0 | 26.0 | 26.0 |
| Total formulation PF | 1080.4 | 1174.5 | 1064.6 | 999.9 | 999.9 | 1255.5 | 1057.0 | 1062.7 | 1062.7 | 1062.6 | 1000.0 | 999.9 |

[1] Ethylene Glycol Monobutyl Ether; coalescing agent (Dow Chemical Company)
[2] Dipropylene Glycol n-Butyl Ether; coalescing agent (Dow Chemical Company)
[3] Surfactant; wetting agent (Troy Chemical Corp.)
[4] Dispersant (Evonik)
[5] Defoamer (Evonik)
[6] Titanium dioxide pigment (Kronos)
[7] Defoame (Byk)
[8] Rheology modifier (Dow Chemical Company); prior to addition diluted with deionized water (1:1 weight ratio)

Each of the formulations were spray applied onto chromated aluminum panels (Q-panels AL-36, available from Q-lab) and allowed to dry for 10-15 min at ambient temperature (23° C.), followed by forced cure drying at 50° C. for 20 min. Subsequently, all panels were left to dry at ambient temperature (23° C.) and 50% relative humidity for 7 days prior to testing. The targeted dry film thickness of the coatings was about 1.2 to 1.6 mils (30 to 40 microns).

The detergent resistance of the dried coatings was determined following the test as described in section 8.7.4 of AAMA 2604-17 and of AAMA 2605-17. According to this test, a 3% (by weight) solution of detergent as prescribed in ASTM D2248, and distilled water was prepared. The solid detergent composition is as given in Table 4.

TABLE 4

| Technical grade reagent | % by weight |
|---|---|
| Tetrasodium pyrophosphate ($Na_4P_2O_7$), anhydrous | 53 |
| Sodium Sulfate ($Na_2SO_4$), anhydrous | 19 |
| Sodium metasilicate ($Na_2SiO_3$), anhydrous | 7 |
| Sodium carbonate ($Na_2CO_3$), anhydrous | 1 |
| Dodecylbenzenesulfonic acid, sodium salt, tech. 88% | 20 |

The coated chromated aluminum panels were immersed in the detergent solution at 38° C. for 72 hours. The samples were then removed and wiped dry. Tape 25 mm wide was immediately applied by pressing down firmly against the coating to eliminate voids and air pockets. The tape specified per ASTM D3359 calls for Permacel 99, which is no longer available. Scotch® Performance Flatback Tape 2525 available from 3M was used as alternative, which has a higher bond strength than Permacel 99 (adhesion to steel: 69 oz./inch width for Scotch 2525 versus 52 oz./inch width for Permacel 99). The tape was placed longitudinally along the entire length of the test specimens. If blisters are visible, the blistered area was taped and rated. The tape was sharply pulled off at a right angle to the plane of the surface being tested, per ASTM D3359. Passed means that there was no loss of adhesion of the coating to the metal, no blistering and no significant visual change in appearance when examined by the unaided eye. Results for the detergent resistance test are given in Table 5. The results clearly show that the working examples (EX) pass the challenging detergent resistance test on chromated aluminum panels whereas the comparative examples (CE) all fail this test.

TABLE 5

| Example | Detergent resistance |
|---|---|
| EX1-PF | Passed |
| EX2-PF | Passed |
| EX3-PF | Passed |
| EX4-PF | Passed |
| CE1-PF | Failed (a/b/c) |
| CE2-PF | Failed (a/b/c) |
| CE3-PF | Failed (a/c) |
| CE4-PF | Failed (c) |
| CE5-PF | Failed (a/b/c) |
| CE6-PF | Failed (a/b/c) |
| CE8-PF | Failed (a/b/c) |
| CE9-PF | Failed (a/b/c) | a) failed on significant change in film appearance
b) failed on blister formation
c) failed on tape adhesion Furthermore, significant differences in coating adhesion were found between the examples and the comparative examples. All examples (EX) showed good dry, wet and boiling water coating adhesion (min 3B-5B) when tested in the white pigmented formulation according the tests described in section 8.7.4 of the AAMA 2604-17 and AAMA 2605-17 specification. All comparative examples (CE) however showed poor dry, wet and boiling water adhesion (0B to max 3B) when tested in the white pigmented formulation according the tests described in section 8.7.4 of the AAMA 2604-17 and AAMA 2605-17 specification.

CE7 was not tested as this binder was not storage stable (settling within a few days) and could not be formulated.

FIGS. 1-5

Figure 2:
Figure 3:
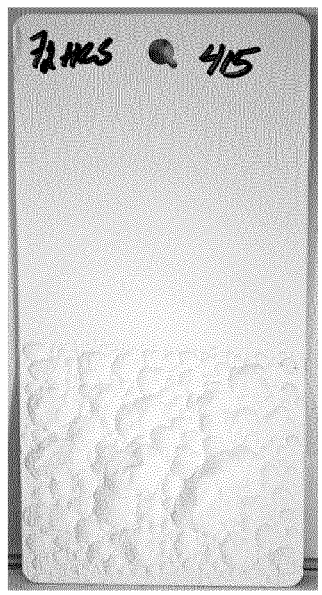
Figure 4:
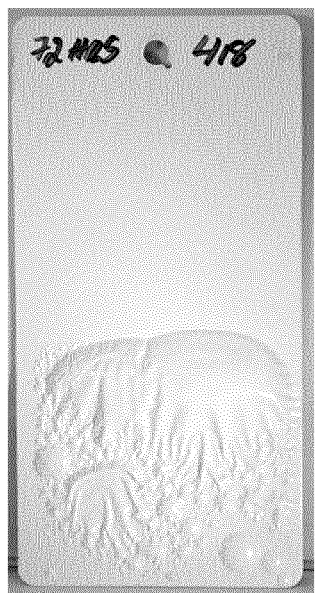
Figure 5:
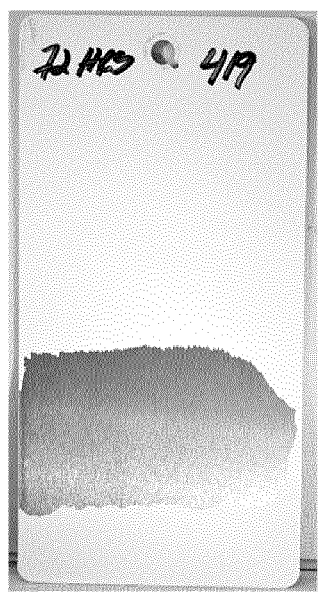

Of Examples 1 and 2 and Comparative Examples 1-3, photos of coated chromated aluminum panels (Q-panels) after the detergent resistance test as described in section 8.7.4 of AAMA 2604/2605-17 have been taken, where the lower half of the coated panel was immersed for 72 hours in the 3 wt. % detergent solution at 38° C.:
FIG. 1: Example 1 (code 416).
FIG. 2: Example 2 (code 417),
FIG. 3: Comparative Example 1 (code 415),
FIG. 4: Comparative Example 2 (code 418), and
FIG. 5: Comparative Example 3 (code 419).

All photos were taken after performing the tape adhesion test, except for Comparative Example 1 (code 415) and Comparative Example 2 (code 418) as these samples already demonstrated clear adhesion failure before performing the tape adhesion test as visible from the strong coating delamination from the substrate.

The invention claimed is:

1. A waterborne dispersion comprising
(A) polymer P;
(B) amphiphilic block copolymer obtained with a controlled radical polymerization process and comprising at least blocks [A] and [B], whereby
block [A] comprises ethylenically unsaturated monomer(s) bearing water-soluble and/or water-dispersible functional groups (monomer(s) (i)), and
block [B] comprises ethylenically unsaturated monomer(s) different from monomer(s) (i) (monomer(s) (ii)); and
(C) crosslinker,
wherein the polymer P is crosslinkable and comprises ethylenically unsaturated monomer(s) bearing crosslinkable functional groups different from monomer(s) (i) and monomer(s) (ii) (monomer(s) (iii)) in an amount of from 2 to 7.5 wt. %, based on the total weight of monomers used to prepare the polymer P,
the amount of block copolymer is from 3 to 15 wt. %, based on the total weight of monomers used to prepare the block copolymer and polymer P and the weight average molecular weight of the block copolymer is in the range of from 7,000 to 50,000 g/mol;
and wherein
the calculated glass transition temperature of the block copolymer is from 50 to 150° C., the acid value of a composition consisting of block copolymer and polymer P is from 3 to 16 mg KOH per g of the composition consisting of block copolymer and polymer P,
and wherein
an equivalent molar ratio of crosslinkable functional groups present in the crosslinker to crosslinkable functional groups present in the block copolymer and polymer P is from 0.5 to 1.0, wherein the equivalent molar ratio is calculated by dividing the molar amount of crosslinkable functional groups present in the crosslinker by the molar amount of crosslinkable functional groups present in the block copolymer and polymer P, which molar amounts are calculated from the amount of crosslinkable functional monomers (iii) which are used for preparing the block copolymer and polymer P and from the amount of crosslinker which is added to the coating composition.

2. The waterborne dispersion according to claim 1, wherein the ethylenically unsaturated monomer(s) (iii) bearing crosslinkable functional groups are ketone functional ethylenically unsaturated monomer(s).

3. The waterborne dispersion according to claim 2, wherein the ketone functional ethylenically unsaturated monomers are selected from the group consisting of (meth) acrolein, diacetone acrylamide, vinyl methyl ketone, and any mixture thereof.

4. The waterborne dispersion according to claim 2, wherein the ketone functional ethylenically unsaturated monomers is diacetone acrylamide.

5. The waterborne dispersion according to claim 1, wherein the crosslinker is a dihydrazide functional compound (containing two hydrazide groups (O=C—NHNH$_2$)) with a molar mass below 1000 g/mole.

6. The waterborne dispersion according to claim 1, wherein block [A] has a Hansch parameter of less than 1.5 and block [B] has a Hansch parameter of at least 1.5.

7. The waterborne dispersion according to claim 1, wherein the amount of ethylenically unsaturated monomer(s) (ii) in block [B] is at least 75 wt. % relative to the total weight amount of monomers used to prepare block [B].

8. The waterborne dispersion according to claim 1, wherein at least 90 wt. % preferably of the total amount of monomers (i) present in the block copolymer-polymer composition is present in block [A].

9. The waterborne dispersion according to claim 1, wherein the water-soluble and/or water-dispersible functional groups are carboxylate groups.

10. The waterborne dispersion according to claim 1, wherein the block copolymer is a diblock copolymer [A]$_x$[B]$_y$,
wherein block [A] has an average degree of polymerization x where x is an integer from 3 to 200, and
wherein block [B] has an average degree of polymerization y where y is an integer >10 and wherein y>x.

11. The waterborne dispersion according to claim 10, wherein x is an integer from 3 to lower than 50.

12. The waterborne dispersion according to claim 10, wherein y is an integer >150.

13. The waterborne dispersion according to claim 1, wherein the polymer P is obtained by an emulsion polymerization effected in the presence of the block copolymer.

14. The waterborne dispersion according to claim 1, wherein the polymer P further contains ethylenically unsaturated monomer(s) (ii) different from (i) and (iii).

15. The waterborne dispersion according to claim 1, wherein the ethylenically unsaturated monomer(s) (ii) are selected from the group consisting of $C_{1-12}$alkyl(meth)acrylate monomers and any mixtures thereof.

16. The waterborne dispersion according to claim 1, wherein the polymer P is present in a polymer composition and at least 20 wt. % of the polymer composition has a polymer fraction with a calculated glass transition temperature >5° C., and <90° C.

17. The waterborne dispersion according to claim 1, wherein the weight average molecular weight of the block copolymer-polymer composition is in the range of from 100,000 to 500,000 g/mol.

18. The waterborne dispersion according to claim 1, wherein the block copolymer is obtained via reversible addition-fragmentation chain transfer (RAFT) polymerization in the presence of a control agent and a source of free radicals, and the RAFT polymerization is effected in solution.

19. The waterborne dispersion according to claim 1, wherein the waterborne dispersion is a one-pack system.

20. A coating composition comprising the waterborne dispersion of claim 1.

21. A coating composition according to claim 20, wherein the coating composition further comprises titanium dioxide in an amount of 15 to 40 volume-% relative to the volume of non-volatile material in the coating composition.

22. A coating composition according to claim 20, wherein the coating composition is a one-pack system.

23. A method of coating a substrate comprising the steps of (1) applying the coating composition from claim 20 to a substrate and (2) drying the coating composition.

24. The method according to claim 23, wherein the substrate is aluminum or pre-treated aluminum.

25. The method according to claim 23, wherein the substrate is a profile for an architectural article.

26. An article having a coating deposited thereon, wherein the coating is obtained by depositing a coating composition according to claim 20 to a substrate and drying the coating composition.

27. An article according to claim 26, wherein the article is a profile for an architectural article.

28. The article according to claim 26, wherein the substrate comprises aluminium.

29. The article according to claim 26, wherein the coating passes the detergent resistance test in AAMA 2604-17, section 8.7.4 and the detergent resistance test described in AAMA 2605-17, section 8.7.4.

30. The waterborne dispersion according to claim 1, wherein the polymer P comprises ethylenically unsaturated monomer(s) (iii) bearing crosslinkable functional groups in an amount of from 2 to 5 wt. %, based on the total weight of monomers used to prepare the polymer P.

31. The waterborne dispersion according to claim 1, wherein the amount of the block copolymer is from 4 to 12 wt. %, based on the total weight of monomers used to prepare the block copolymer and polymer P.

32. The waterborne dispersion according to claim 5, wherein the dihydrazide functional compound is adipic dihydrazide.

* * * * *

UNITED STATES PATENT AND TRADEMARK OFFICE
CERTIFICATE OF CORRECTION

| | | |
|---|---|---|
| PATENT NO. | : 11,965,050 B2 | Page 1 of 1 |
| APPLICATION NO. | : 16/771903 | |
| DATED | : April 23, 2024 | |
| INVENTOR(S) | : Schellekens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this
Twenty-sixth Day of August, 2025

Coke Morgan Stewart
*Acting Director of the United States Patent and Trademark Office*